US012347056B2

(12) United States Patent
Hill et al.

(10) Patent No.: US 12,347,056 B2
(45) Date of Patent: Jul. 1, 2025

(54) SMART PLACEMENT OF INFORMATION BASED ON DYNAMIC ENVIRONMENTS

(71) Applicant: Microsoft Technology Licensing, LLC, Redmond, WA (US)

(72) Inventors: Erik Alexander Hill, Woodinville, WA (US); Andrew Jackson Klein, Vancouver (CA); Benjamin James Andrews, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 262 days.

(21) Appl. No.: 18/138,523

(22) Filed: Apr. 24, 2023

(65) Prior Publication Data

US 2024/0355077 A1    Oct. 24, 2024

(51) Int. Cl.
*G06T 19/00* (2011.01)
*G06T 19/20* (2011.01)

(52) U.S. Cl.
CPC .......... *G06T 19/20* (2013.01); *G06T 2210/61* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 10,445,942 B1 * | 10/2019 | Pekelny | G06F 3/011 |
| 10,881,353 B2 * | 1/2021 | Shoudy | A61B 8/4245 |
| 10,950,056 B2 | 3/2021 | Park et al. | |
| 11,145,126 B1 | 10/2021 | Bramwell et al. | |
| 2011/0128555 A1 * | 6/2011 | Rotschild | G06F 3/0304 359/9 |
| 2018/0299828 A1 * | 10/2018 | Gasking | G03H 1/08 |
| 2019/0096084 A1 | 3/2019 | Mayer | |
| 2019/0282324 A1 | 9/2019 | Freeman | |
| 2019/0380792 A1 * | 12/2019 | Poltaretskyi | G06N 3/045 |

FOREIGN PATENT DOCUMENTS

KR    101623041 B1    5/2016

OTHER PUBLICATIONS

International Search Report and Written Opinion received for PCT Application No. PCT/US2024/024833, Sep. 2, 2024, 16 pages.
"Vuforia Studio Augmented Reality", Retrieved from: https://web.archive.org/web/20221029100528/https://www.ptc.com/en/products/vuforia/vuforia-studio, Oct. 29, 2022, 6 Pages.

(Continued)

*Primary Examiner* — Martin Mushambo
(74) *Attorney, Agent, or Firm* — Workman Nydegger

(57) ABSTRACT

Techniques for intelligently repositioning a hologram for an object in a scene based on a past condition of the object and/or a planned future condition of the object are disclosed. A hologram is identified for an object in a scene. Identifying the hologram includes identifying a current location of the hologram within the scene. Time-based data associated with the object is accessed. The time-based data includes at least one of a past condition of the object or a planned future condition of the object. A new location for the hologram is selected within the scene. This selection is based on the time-based data. The hologram is then repositioned to the new location.

20 Claims, 20 Drawing Sheets

(56) References Cited

OTHER PUBLICATIONS

Chacko, Phil, "Unity Mars—a first-of-its-kind solution for intelligent AR", Retrieved from: https://blog.unity.com/technology/introducing-unity-mars-a-first-of-its-kind-solution-for-intelligent-ar, Jun. 8, 2020, 11 Pages.

Dixit, et al., "Optimal Information Placement in an Interactive 3D Environment", In Proceedings of the 2007 ACM SIGGRAPH symposium on Video games, Aug. 4, 2007, pp. 141-148.

Gorajia, et al., "The future of manufacturing—Designing a robust industrial augmented reality solution", Retrieved from: https://www.readkong.com/page/the-future-of-manufacturing-designing-a-robust-industrial-6637160, Apr. 20, 2021, 14 Pages.

Neb, et al., "Generation of AR-enhanced Assembly Instructions based on Assembly Features", In proceedings of 51st CIRP Conference on Manufacturing Systems, Jan. 1, 2018, pp. 1118-1123.

Vice, et al., "Advanced deployment guides for Microsoft 365 and Office 365 products", Retrieved from: https://learn.microsoft.com/en-us/microsoft-365/enterprise/setup-guides-for-microsoft-365?view=o365-worldwide, Feb. 27, 2023, 13 Pages.

* cited by examiner

SMART PLACEMENT OF INFORMATION BASED ON DYNAMIC ENVIRONMENTS

BACKGROUND

The phrase "extended reality" (ER) is an umbrella term that collectively describes various different types of immersive platforms. Such immersive platforms include virtual reality (VR) platforms, mixed reality (MR) platforms, and augmented reality (AR) platforms. The ER system provides a "scene" to a user. As used herein, the term "scene" generally refers to any simulated environment (e.g., three-dimensional (3D) or two-dimensional (2D)) that is displayed by an ER system.

For reference, conventional VR systems create completely immersive experiences by restricting their users' views to only virtual environments. This is often achieved through the use of a head mounted device (HMD) that completely blocks any view of the real world. Conventional AR systems create an augmented-reality experience by visually presenting virtual objects that are placed in the real world. Conventional MR systems also create an augmented-reality experience by visually presenting virtual objects that are placed in the real world. In the context of an MR system, those virtual objects are typically able to be interacted with by the user, and those virtual objects can interact with real world objects. AR and MR platforms can also be implemented using an HMD. ER systems can also be implemented using laptops, handheld devices, and other computing systems.

Unless stated otherwise, the descriptions herein apply equally to all types of ER systems, which include MR systems, VR systems, AR systems, and/or any other similar system capable of displaying virtual content. An ER system can be used to display various different types of information to a user. Some of that information is displayed in the form of a "hologram." As used herein, the term "hologram" generally refers to image content that is displayed by an ER system. In some instances, the hologram can have the appearance of being a 3D object while in other instances the hologram can have the appearance of being a 2D object.

Often, holograms are displayed in a manner as if they are a part of the actual physical world. For instance, a hologram of a flower vase might be displayed on a real-world table. In this scenario, the hologram can be considered as being "locked" or "anchored" to the real world. Such a hologram can be referred to as a "world-locked" hologram or a "spatially-locked" hologram that is spatially anchored to the real world. Regardless of the user's movements, a world-locked hologram will be displayed as if it was anchored or associated with the real-world. Holograms can also be locked to a particular position with respect to the user's field of view (FOV). Regardless of any movement the user might make, the hologram remains positioned at the same location in the user's FOV.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to computer systems, devices, and methods that intelligently reposition a hologram for an object in a scene based on a past condition of the object and/or a planned future condition of the object, said techniques include: identifying a hologram for an object in a scene, wherein identifying the hologram includes identifying a current location of the hologram within the scene; accessing time-based data associated with the object, wherein the time-based data includes at least one of a past condition of the object or a planned future condition of the object; selecting a new location for the hologram within the scene based on the time-based data; and causing the hologram to be repositioned to the new location.

In some aspects, the techniques include accessing a set of placement governing criteria, wherein the set of placement governing criteria includes one or more of: (i) a specific placement of the hologram as specified by a content author, (ii) a placement range of the hologram as specified by the content author, (iii) a state of the object, (iv) a state of a different object in the scene, or (v) a layout of the scene. The process of selecting the new location for the hologram within the scene may then be based on (i) the time-based data and (ii) the set of placement governing criteria.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
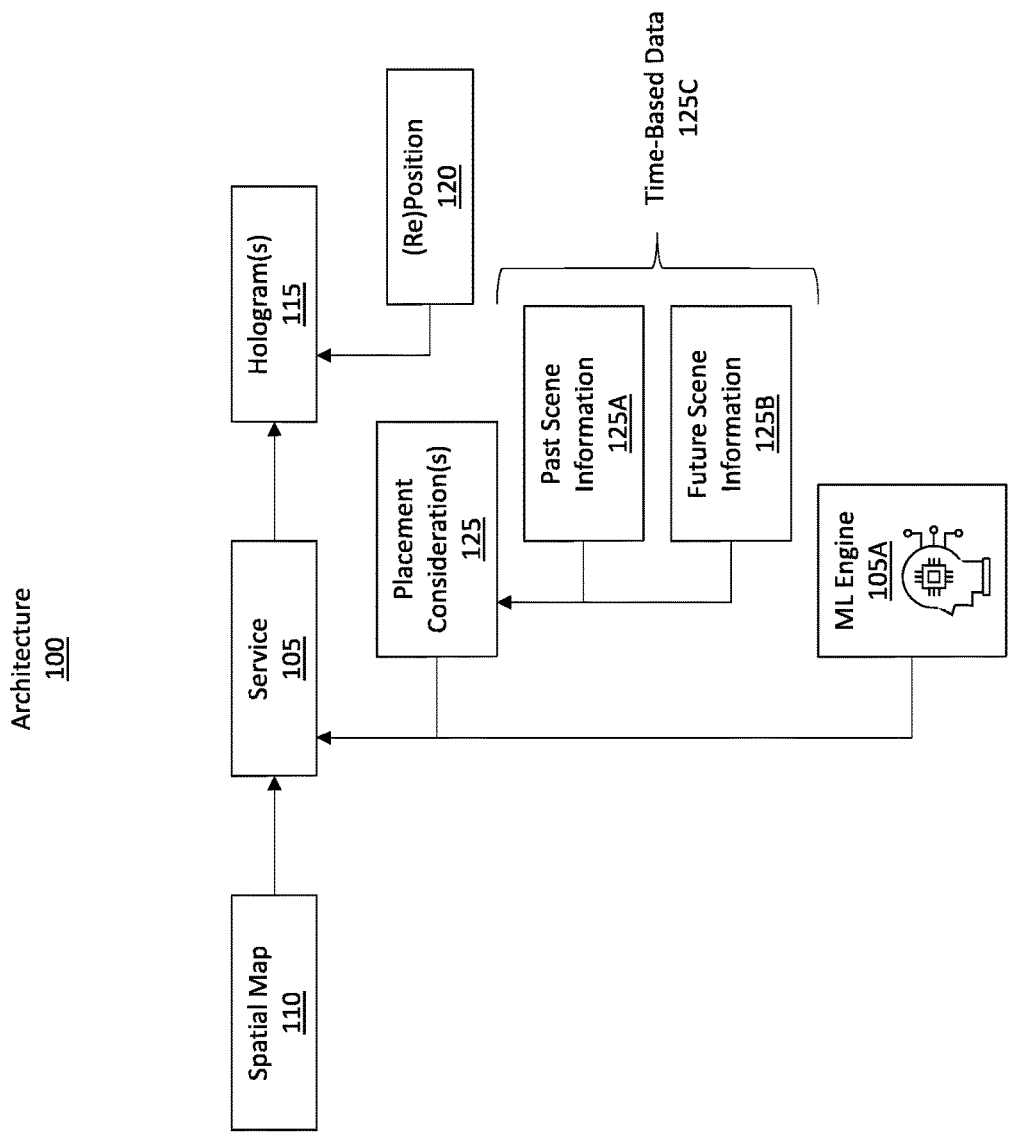
FIG. 1 illustrates an example architecture for repositioning a hologram.

Traditional techniques for placing holograms within a scene are simplistic in their approach. For instance, one such technique, called "billboarding," involves placing a hologram in a scene and then causing that hologram to rotate about an axis so that the hologram constantly faces the user. Another technique involves tethering a hologram to a real-world object. Yet another technique involves placing a hologram at a particular position in the user's FOV and causing that hologram to remain at that position regardless of any movements the user makes. Another technique involves an object, such as perhaps a quick response (QR) code. One or more holograms can be associated with that QR code. The QR code can be placed anywhere in the scene, and the holograms will be displayed around that QR code.

Various problems have arisen with regard to these traditional techniques. For instance, consider a scenario where a technician is working on a vehicle and using an ER system, such as in the form of an HMD. The HMD may be presenting the technician with a number of steps to follow to guide the technician in repairing the vehicle. What would often happen when the traditional hologram placement techniques were used is that certain objects or features in the scene would become obfuscated or otherwise lost to the technician because they would be covered by a hologram. For instance, if the technician placed a tool on a table, often what would happen is that a hologram would be displayed without consideration of where the tool is. Sometimes, the hologram would be displayed overtop of the tool, and the technician would lose sight of the tool. If the technician subsequently needed the tool, the technician was frustrated because he could not find the tool.

Thus, one of the problems with the traditional placement of holograms is that ER systems failed to account for past conditions associated with an object in the scene and/or for planned future conditions associated with the object. The disclosed embodiments solve these problems by factoring in those conditions, as well as many others, when determining how to position or reposition a hologram in a scene. By "reposition" it is meant that a hologram is originally assigned a first location and then the hologram is subsequently assigned a second location. In some instances, the hologram is never displayed at the first location but is displayed at the second location. In some instances, the hologram is temporarily displayed at the first location for a brief period of time, and then the hologram is moved to the second location. Optionally, the brief period of time may be so short that a user does not even recognize that the hologram was originally at the first location. For example, the brief period of time may be less than 1 millisecond.

As various examples, information and instructions can be placed in a 3D environment based on where the information is most relevant. This information may then be viewed by an ER capable device. In some embodiments, this placement is decided based on various factors. Some of these factors include, but are not limited to, past conditions of an object, future conditions of an object, a specific placement or placement ranges specified by a content author, the object and the state of the object that is serving as the focus of the information, the layout of other items (and their states) that are related to the information, and/or the layout of the room.

As an example, imagine the technician example referenced above. The technician, who is wearing an HMD, may open a guide on how to install an engine into a truck. The HMD can optionally begin by scanning the technician's work area. This scan can be near-instantaneous and may not require the technician to perform any specific action. If the HMD determines that an updated understanding of the space is warranted, the HMD can prompt the technician to look at specific objects to achieve this.

In this example, the guide places the first instructional step in the form of a hologram at a location that is proximate to the truck. In this example, this initial placement is based on a specific placement or placement range as specified by a content author. Since the guide recognized the truck model and can understand the precise engine placement of this model, the guide, via the HMD, can adjust the displayed holographic information based on the object and based on the state of that object. For instance, if the truck hood is recognized as being open, the guide understands the state of this object, and the guide can adjust the holographic information accordingly.

The next instructional step involves checking the engine. A hologram corresponding to this instructional step can be placed near the engine. Based on the distance of the object to the truck and based on the state of the engine (e.g., perhaps it is on the floor and not in a hoist), the information and placement of the information may be adjusted using the layout of other objects in the scene. Since these guide steps and holographic information may be difficult for the user to read based on the position in the room (e.g., since the engine is on the floor, perhaps near a table), the holographic information may be further adjusted based on the layout of the room.

Accordingly, the disclosed principles not only relate to how holographic information is placed but also relate to the authoring method that allows an author to perform various actions. These actions include, but are not limited to, setting the location and the ranges of acceptable locations of a hologram based on objectives of a corresponding object or based on guidance steps (and their states and relations). The actions further include setting the holographic information presented based on various states and relations between the objects.

In doing so, the embodiments bring about numerous benefits, advantages, and practical applications to the technical field of hologram placement, and more generally to ER system performance. As one benefit, the embodiments significantly improve a user's experience with the ER system because the embodiments improve how holograms are placed in the scene, thereby improving the user's experience. The embodiments also reduce the user's frustration by avoiding scenarios in which certain content is obfuscated due to a hologram's placement. Accordingly, these and numerous other benefits will now be described in more detail throughout the remaining portions of this disclosure.

Example Architecture

Attention will now be directed to FIG. 1, which illustrates an example architecture 100 that can provide the above benefits and that can be used to intelligently determine a position of a hologram in a scene. Architecture 100 is shown as including a service 105.

As used herein, the term "service" refers to an automated program that is tasked with performing different actions based on input. In some cases, service 105 can be a deterministic service that operates fully given a set of inputs and without a randomization factor. In other cases, service 105 can be or can include a machine learning (ML) or artificial intelligence engine, such as ML engine 105A.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 105 is a cloud service operating in a cloud environment. In some implementations, service 105 is a local service operating on a local device, such as an HMD. In some implementations, service 105 is a hybrid service that includes a cloud component that communicates with a local component.

Figure 2:
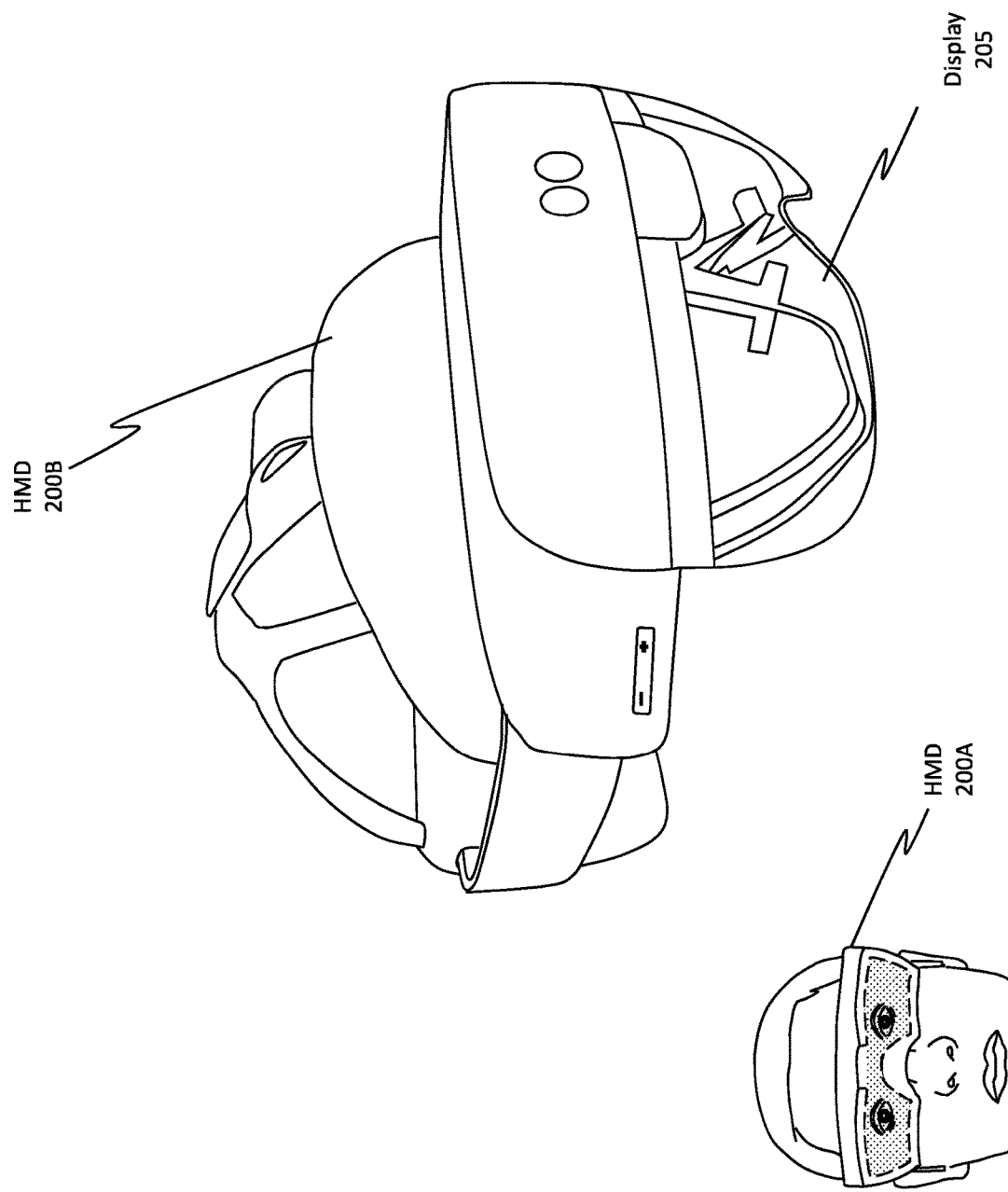
FIG. 2 illustrates an example of an HMD that can implement an ER system.

Turning briefly to FIG. 2, an HMD 200A and 200B is shown. HMD 200A/B can implement the architecture 100 of FIG. 1, or at least can implement the service 105. To display the scene, the HMD 200B includes a display 205. Holograms can be displayed to the user via the display 205.

Returning to FIG. 1, the service 105 accesses a spatial map 110. The phrase "spatial map" refers to a 3D representation of an environment, regardless of whether that environment is a virtual environment or a real-world environment. The phrase "surface reconstruction map" is an analogous phrase to "spatial map."

The process of "accessing" the spatial map 110 can be performed in numerous ways. In some instances, "accessing" involves the HMD using its scanning sensors to create the spatial map 110. In some instances, "accessing" involves the HMD obtaining the spatial map 110 from a repository (e.g., a cloud storage environment), such that the spatial map 110 was previously generated, perhaps by a different HMD or scanning sensor or perhaps by the same HMD. Thus, in some instances, the HMD itself generates the spatial map while in other instances the HMD fetches the spatial map from an external source.

Service 105 uses the spatial map 110 to generate or access one or more hologram(s) 115. For instance, it may be the case that one or more holograms were previously associated with the spatial map 110 for the scene. In other scenarios, it may be the case that the holograms are generated using spatial map 110. In any event, one or more hologram(s) 115 are provided for display in a scene rendered by the HMD, where that scene is associated with the spatial map 110.

In accordance with the disclosed principles, the embodiments are configured to intelligently position or (re) position 120 the holograms 115 within the scene in accordance with one or more placement consideration(s) 125. Two particular placement considerations are called out in FIG. 1 inasmuch as these placement considerations are often weighted or prioritized.

These two particular placement considerations include past scene information 125A and future scene information 125B. Collectively, the past scene information 125A and the future scene information 125B constitute so-called "time-based data" 125C.

The embodiments are able to monitor the objects in the scene, where these objects can include holograms or real-world objects. As a part of this monitoring, the embodiments can optionally maintain a historical log that tracks how those objects have been used. Additionally, as a part of this monitoring, the embodiments may maintain a planned future usage of those objects, where this planned future usage can be based on a predicted future usage or a planned future usage.

As an example, consider a scenario where a technician is following a procedure guidebook on how to repair an engine. In this scenario, the technician is using a tool. The embodiments are able to track and monitor the past usage of the tool by the technician as well as the planned future usage of the tool by the technician based on the procedure guidebook. Using this past and future information, the embodiments are able to intelligently position a hologram, which corresponds to the tool, in the scene. Further details and examples on this intelligent placement will be provided shortly. In any event, the embodiments are structured to reposition a hologram based on the placement consideration(s) 125.

Figure 3:
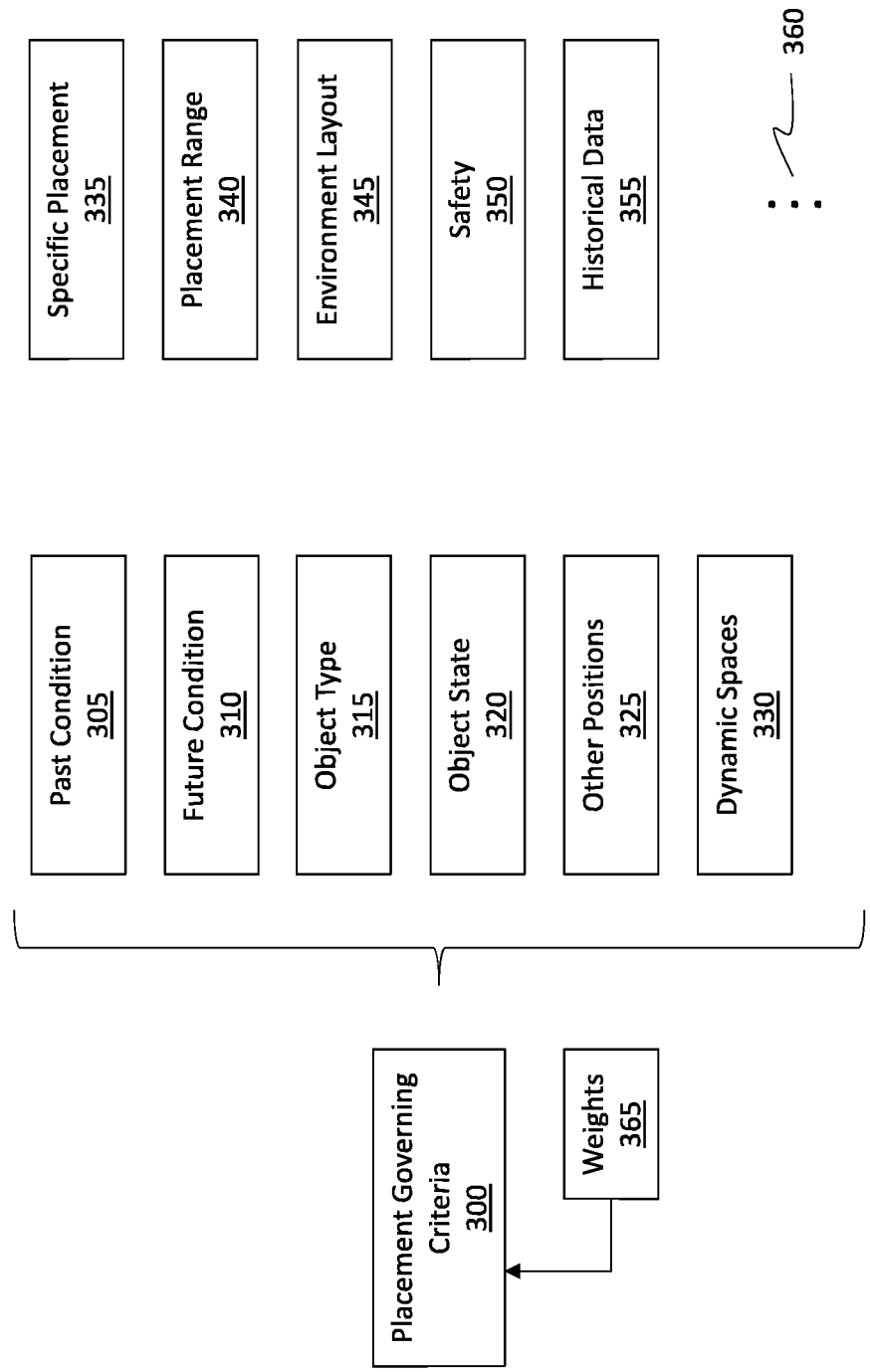
FIG. 3 illustrates various examples of placement considerations.

FIG. 3 shows some additional placement governing criteria 300, which correspond to the placement consideration(s) 125 of FIG. 1. The placement governing criteria 300 include numerous considerations on how the embodiments determine where to position or where to reposition a hologram.

For instance, the considerations include past condition 305 and future condition 310, which correspond to the past scene information 125A and future scene information 125B of FIG. 1, respectively (collectively, "time-based data"). Other considerations that are relied on when positioning or repositioning a hologram include the following: an object type 315, an object state 320, other positions 325, dynamic spaces 330, a specific placement 335, a placement range 340, an environment layout 345, a safety 350 consideration, or historical data 355. The ellipsis 360 shows how this list is not exhaustive and other considerations can be used.

As mentioned previously, the past condition 305 generally refers to past conditions, usages, or behaviors associated with an object. This information can include tracking information that details movements and/or usages of the object. "Usage" generally refers to the interaction a user has with an object. The information can further include a duration that the object was used and/or a duration that the object was not used. The information can include location information that details where the object is located or has previously been located in the scene. The information can further include what other objects this object interacted with (e.g., a wrench might be used to tighten a bolt). For instance, if the object is a tool that was used to repair an engine, then the embodiments can maintain information that correlates the tool with the engine.

The future condition 310 can include all of the information listed above but with respect to future interactions with the object. For example, the future condition 310 can include planned or predicted usages of an object within the scene and/or planned or predicted interactions with other objects.

The object type 315 is based on a determined type or classification for the object. For instance, if the object is a car, then the type for that car can be set as a "vehicle." If the object is a wrench, then the type can be set as a "tool." The embodiments are able to assign a type to each object in the scene. In some cases, the ML engine can assign the types to the objects based on image analysis and image segmentation techniques.

The object state 320 refers to the state or status of the object. As an example, if the object is a hood of a car, the state can be open or closed. Similarly, if the object is a door, the state can be open or closed. The state of an object can be determined, in some instances, based on the type for that object. Different types of objects will have different states associated with them. In some instances, the state may be inherent to a functionality of the object, such as the closed or open state of a hood. In some instances, the state may not relate to the functionality of the object or the state may relate to another object. For instance, if an engine is elevated by way of a hoist, then the state of the engine may be "removed" with respect to the car.

Other positions 325 refers to the locations or positions of other objects in the scene. It may be the case that these positions change or are static. For instance, if the engine is elevated using the hoist, the position of the engine may change as the hoist is moved. Regardless, the embodiments are able to track the positions of all the objects in the scene.

Dynamic spaces 330 refers to areas in the scene that are identified as being dynamic, or rather, that have high levels of movement (e.g., a level of movement that exceeds a threshold level). As an example, a hallway full of moving people may be considered as a dynamic space. In contrast, an area where no people are located and where no objects are moving will not be considered a dynamic space.

The specific placement 335 refers to a placement of a hologram that a content author has selected. Similarly, the placement range 340 refers to an area or range of areas that a content author has selected to display a hologram. As an example, the content author may specify that a hologram is to be placed within a threshold distance of an object, such as perhaps with a set number of inches or feet relative to the object.

The environment layout 345 refers to the organization or layout of a room or other type of environment. The layout 345 can factor in the walls, ceiling, or floor or even the presence or absence of other objects in the environment.

Safety 350 refers to a scenario where an area or perhaps an object is identified as having potential safety or hazard concerns. For instance, a spinning fan may be identified as being unsafe if the blades are touched. The embodiments can determine that holograms should not be displayed immediately in front of the spinning blades of the fan. A user or content author can identify any area or object as having potential safety issues and thus be avoided for hologram placement.

Historical data 355 refers to historical usage of a hologram or object. That is, historical data 355 refers to how an object was previously interacted with by a user or a group of users. As a specific example, the historical data may reveal that a majority of users, when interacting with a hologram of a particular type, always move the hologram to a particular location in the scene or in their FOVs. The embodiments are able to obtain and analyze this historical data 355 to derive behaviors based on that data. The placement of a hologram can be based on this historical data.

As mentioned previously, these factors or criteria are considered when determining where to position or reposition a hologram in a scene. The embodiments can optionally apply weights 365 to these criteria to prioritize one over another. For instance, the safety 350 consideration may be weighted more heavily than the historical data 355 consideration. Thus, even if a majority of users have moved a hologram to a certain location, if that location is identified as being one that has a safety issue, then the embodiments may refrain from automatically positioning the hologram at that location because the safety 350 consideration is weighted more heavily than the historical data 355 consideration.

Examples of Positioning Holograms

Attention will now be directed to FIGS. 4 through 18, which illustrate various example use case scenarios in which the disclosed principles can be employed. It will be appreciated how these scenarios are provided for example purposes only, and the disclosed principles should be interpreted more broadly. FIGS. 4 through 9 are focused on a guided or learning scenario in which a technician is guided in performing a process via use of an HMD.

Figure 4:
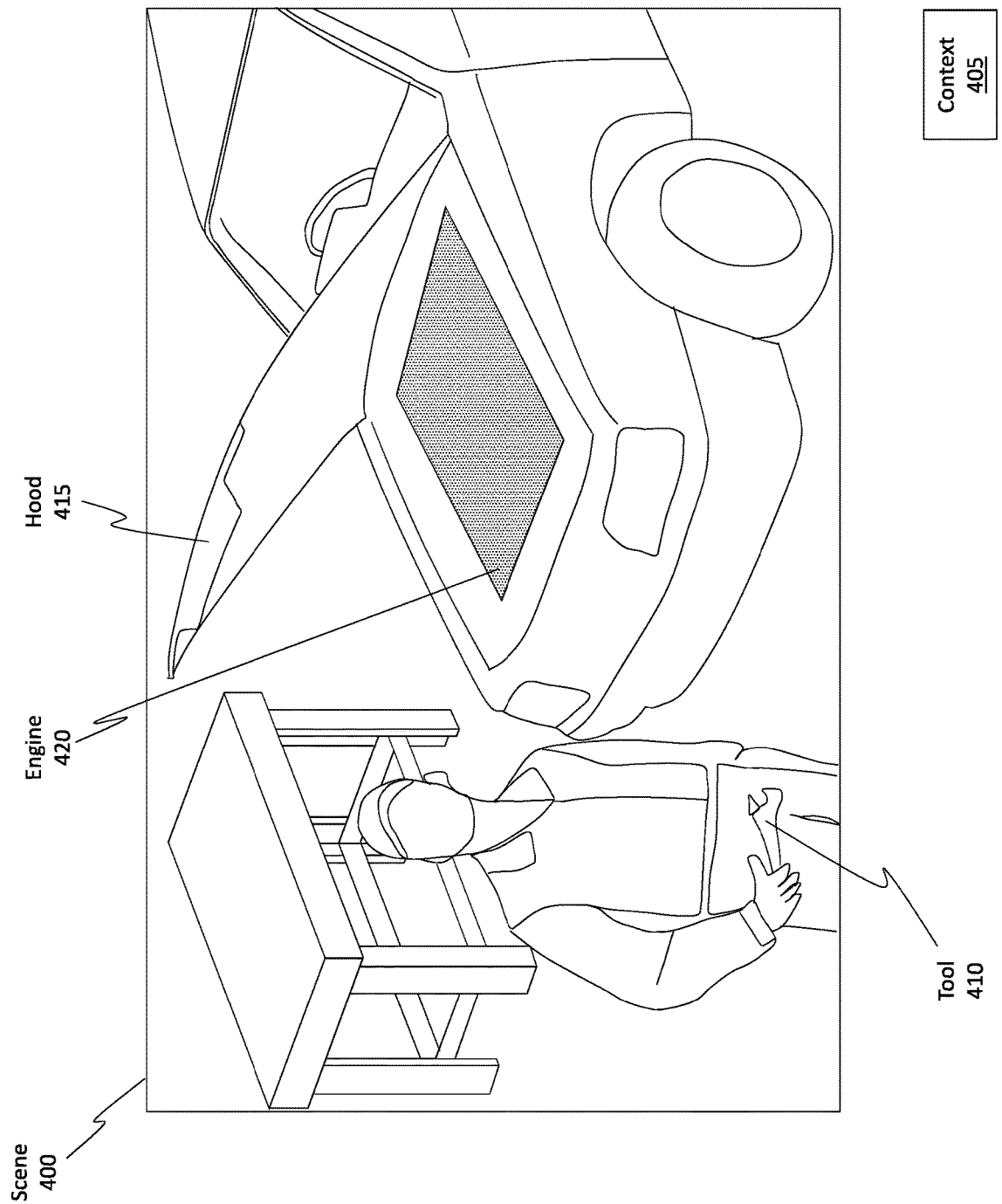
FIG. 4 illustrates an example scene provided by an ER system.

FIG. 4 shows an ER scene 400 in which a technician is wearing an HMD (not labeled) and is being guided in repairing a car engine. Various instructions in the form of holograms are provided to the technician. In this example scenario, the repair process includes multiple different steps and the use of multiple different tools. The tools can be examples of objects in the scene 400.

Different holograms will be displayed, such as ones that provide instructions to the technician and ones that call out or identify tools the technician is to use. During the repair process, the embodiments maintain past scene information for the various objects in the scene. For instance, the location and usage of the tool can be maintained.

Additionally, the embodiments will maintain future scene information for the objects. For instance, the embodiments may determine that a tool will be used in a future step.

In determining where to place holograms, the embodiments will rely on one or more of the past scene information and/or the future scene information. Additionally, in considering where to place holograms, the embodiments may rely on any of the placement governing criteria 300 of FIG. 3.

The context 405 of the scene 400 is thus one where a user is being guided to perform various different steps throughout a time duration. As mentioned above, this context 405 involves a scenario where past usage and planned future usage of objects will occur. The embodiments are able to track these usages and position holograms based on that data.

In FIG. 4, the technician is shown as holding a tool 410, which is an example of an object that may be associated with one or more holograms, which are not yet displayed. Other objects in the scene 400 include a hood 415 of a car and an engine 420 of the car. Currently the state of the hood 415 is shown as being open such that the engine 420 is exposed.

Figure 5:
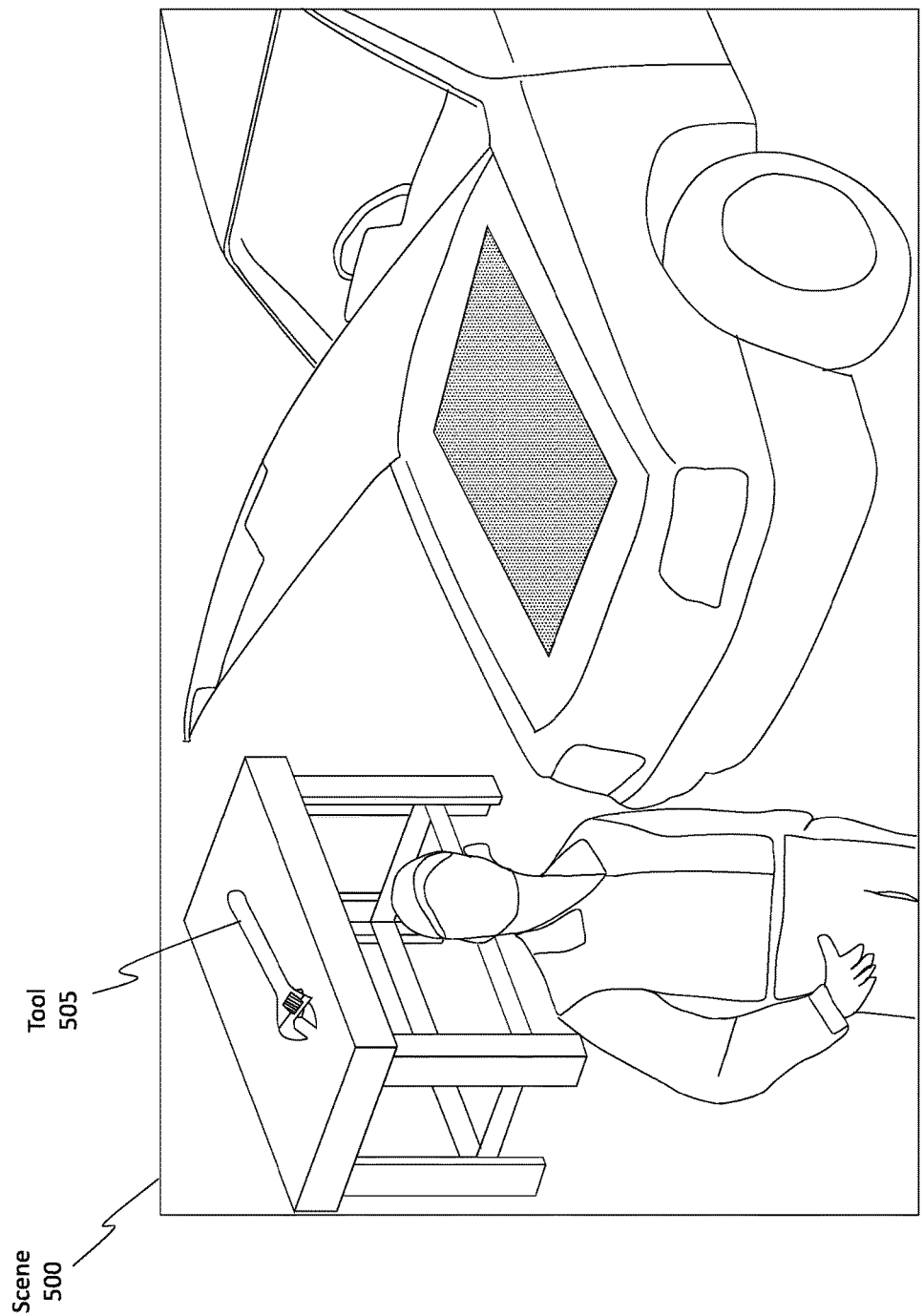
FIG. 5 illustrates another example scene.

FIG. 5 shows a scene 500 where the user has placed the tool 505 on a table because the user is no longer using it. The embodiments are able to track this movement and the location of the tool on the table. This information can be included in a database that includes location information and usage information for the tool.

Figure 6:
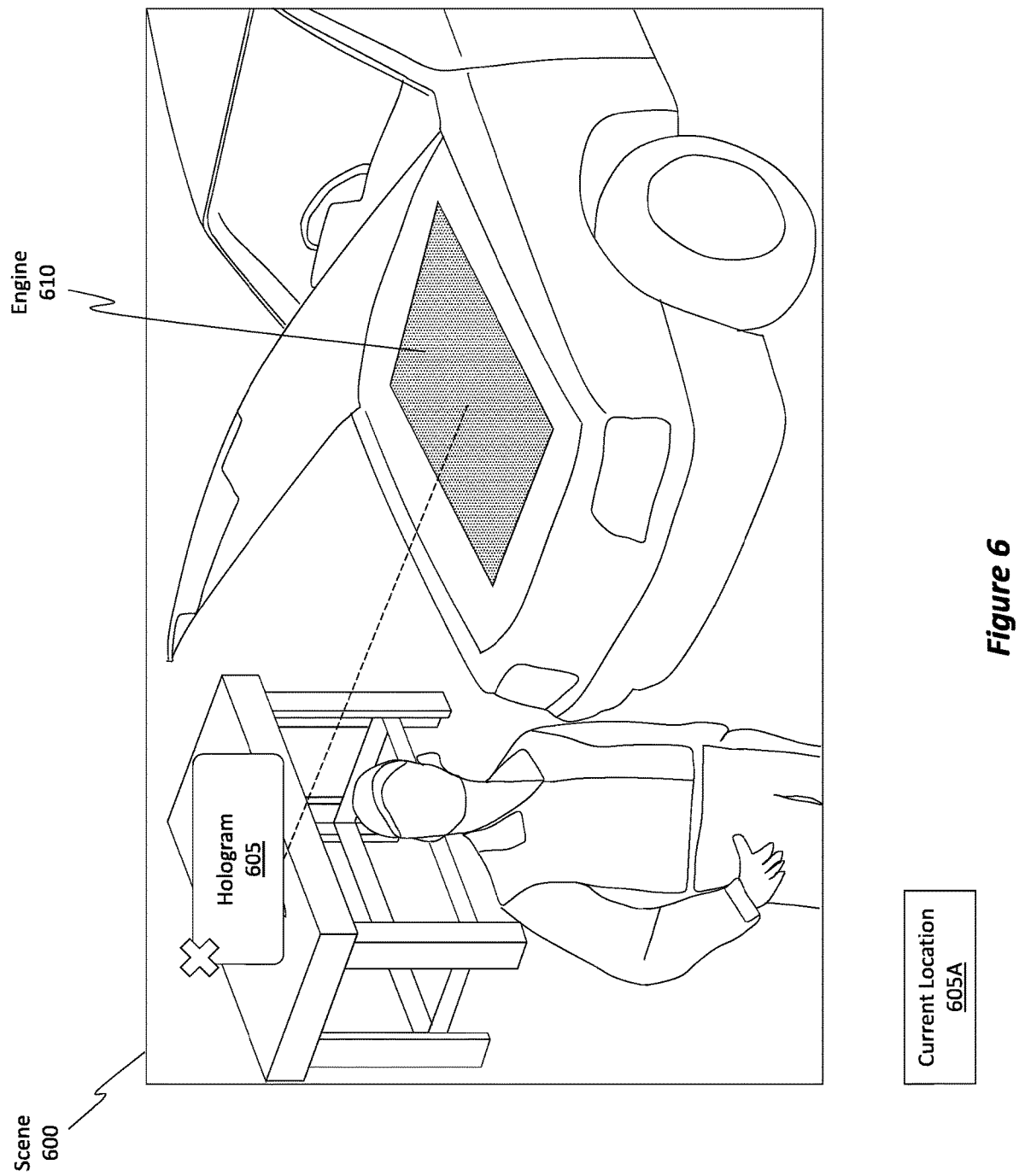
FIG. 6 illustrates another example scene.

FIG. 6 shows a scenario that is avoided by the disclosed embodiments. In particular, FIG. 6 shows a scene 600 where a hologram 605 is currently positioned overtop of the tool, which is now no longer visible to the technician. That is, the current location 605A of the hologram 605 is over the tool.

The hologram 605 is associated with the engine 610, and the hologram 605 was placed at its current location so as to avoid obfuscating the engine 610. Unfortunately, the current location of the hologram 605 is one that has now obfuscated the tool. Notably, that tool will be used at a later time by the technician to perform work on the engine 610. Because the tool is covered by the hologram 605, the technician may have difficulty finding the tool.

FIG. 6 thus presents a scenario where the placement of the hologram 605 was performed without consideration of the past or planned future usage or conditions of the tool. The disclosed embodiments improve upon existing hologram placement techniques by expressly considering the past and/or planned future usage or conditions of an object in the scene as well as the past and/or future conditions of other objects in the scene. By doing so, the embodiments can avoid the scenario presented in FIG. 6 and ensure that holograms are not placed at locations that might interfere with the user's experience. For instance, in FIG. 6, if the technician were to look for the tool, it might be the case that the technician would not be able to locate the tool because it is blocked by the hologram 605.

Figure 7:
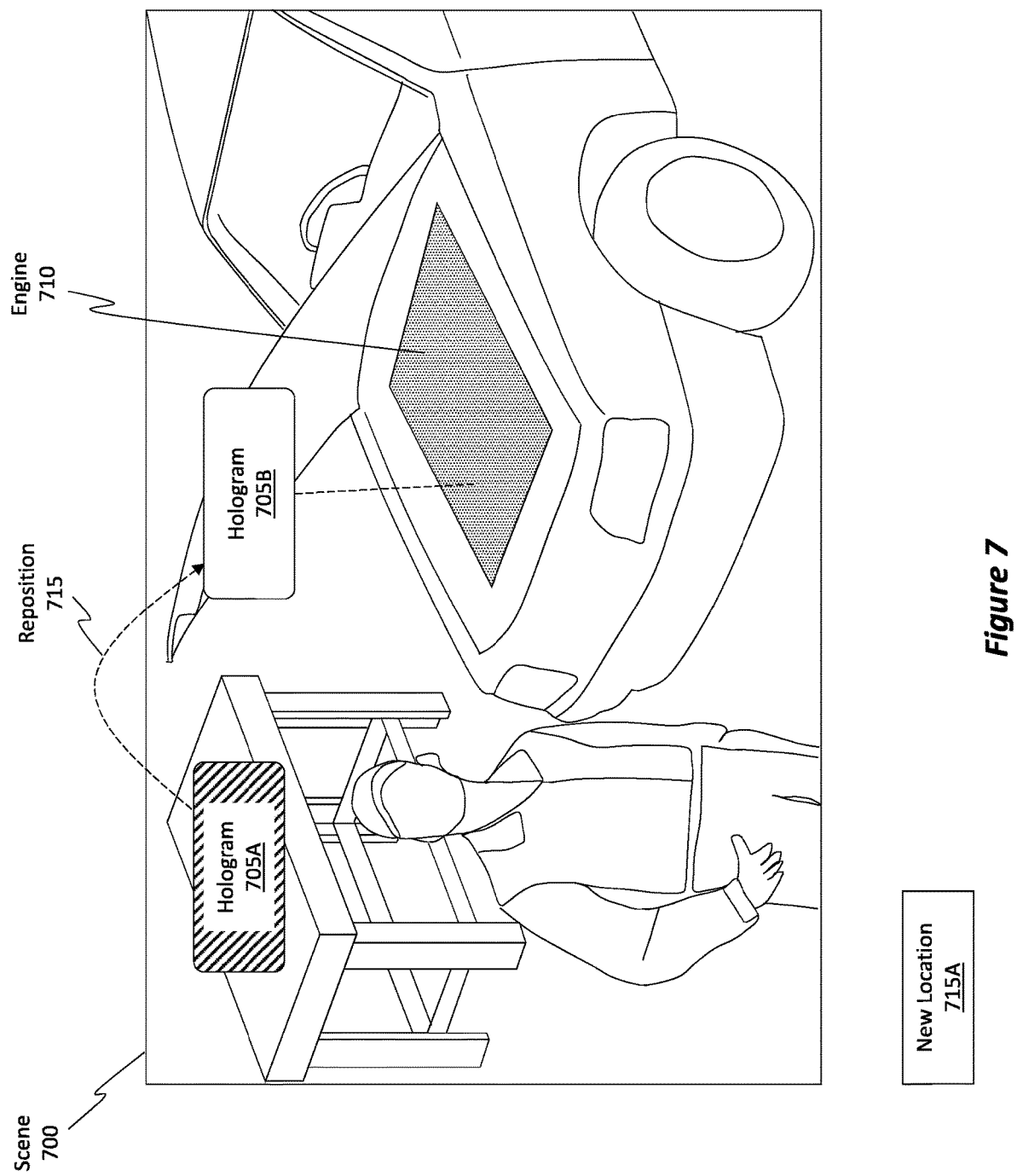
FIG. 7 illustrates another example scene.

FIG. 7 shows a scene 700 in which a hologram 705A has been repositioned or moved in the scene 700 so that the hologram 705A no longer covers the tool. That is, the embodiments moved/repositioned the hologram 605 from FIG. 6 to a new location 715A, as shown by reposition 715 arrow. Hologram 705A shows the hologram at its previous location and hologram 705B shows the hologram at its repositioned new location.

Notably, the placement of the hologram 705B was selected based on the consideration of the past scene information and the future scene information as well as any of the placement consideration(s) mentioned previously. Here, the embodiments determined that the tool on the table will subsequently be used by the technician and thus should not be covered by a hologram. As a result, the embodiments repositioned the hologram 705A to the new location 715A so as to avoid a scenario where the hologram 705B covers the tool.

Figure 8:
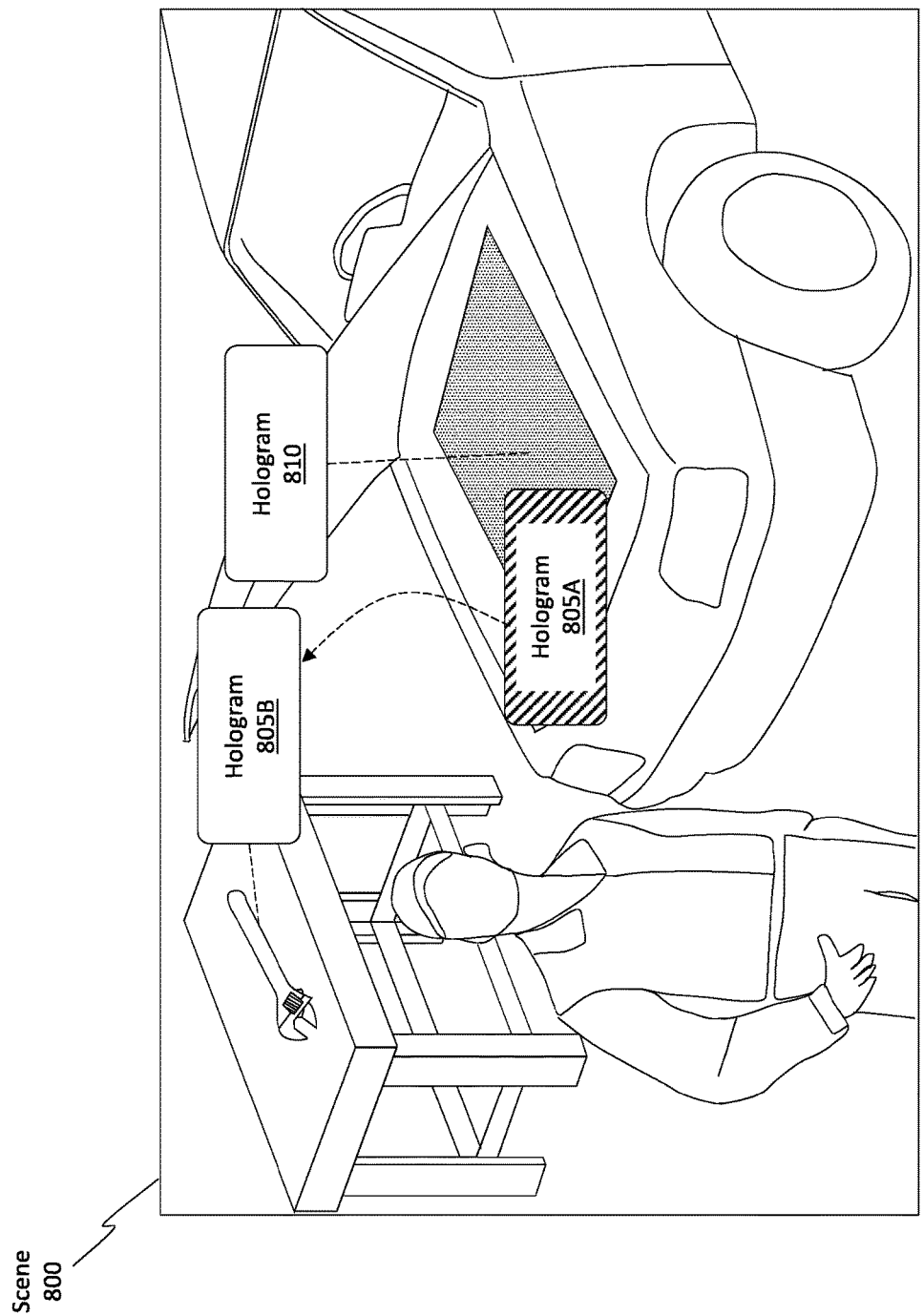
FIG. 8 illustrates another example scene.

FIG. 8 shows a scene 800 in which a first hologram 805A is repositioned to a new location, as shown by hologram 805B. The hologram 805A/B is being displayed for the tool. Hologram 805A is repositioned because it was originally blocking a portion of the car's engine. In this example scenario, it is desirable to not block a view of the engine (as determined by the governing criteria), so the embodiments repositioned the hologram 805A to the location of hologram 805B.

A second hologram 810 is also being displayed and is for the engine. The placement of these holograms was based on the placement consideration(s) mentioned earlier. Notice, because the embodiments predicted or recognized that the tool will subsequently be used by the technician, none of the holograms are placed at positions that would impede the technician's view of the tool. Similarly, none of the holograms are placed at positions that would impede the technician's view of the engine because the embodiments also determined that the view of the engine is relevant for the technician given the context of the scene 800.

Figure 9:
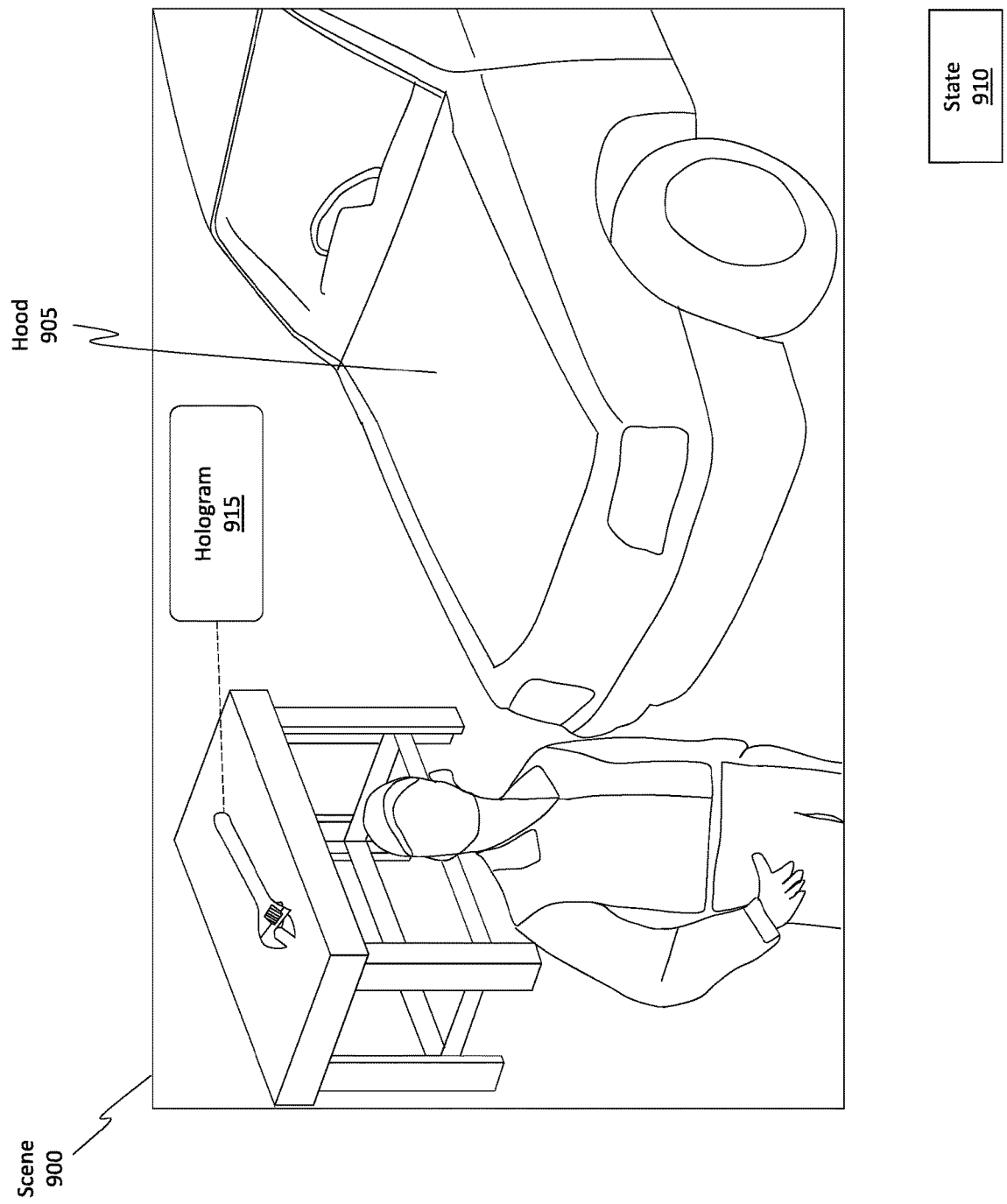
FIG. 9 illustrates another example scene.

FIG. 9 shows a scene 900 where the hood 905 is now in a closed state such that the engine is no longer visible. Inasmuch as the state of the hood 905 has changed as compared to the state shown in FIG. 8 (e.g., open), the embodiments have determined that the hologram 810 for the engine is no longer needed, and the embodiments have ceased displaying that hologram. Thus, the embodiments, in determining where and how to place holograms, considered the state 910 of objects in the scene. FIG. 9 continues to show the hologram 915 for the tool. In this example scenario, the placement of the hologram 915 has shifted because now the hood is closed and there is additional room for the hologram 915 without impeding view of another object. Thus, the position of a hologram can be modified as the conditions in the scene change.

Figure 10:
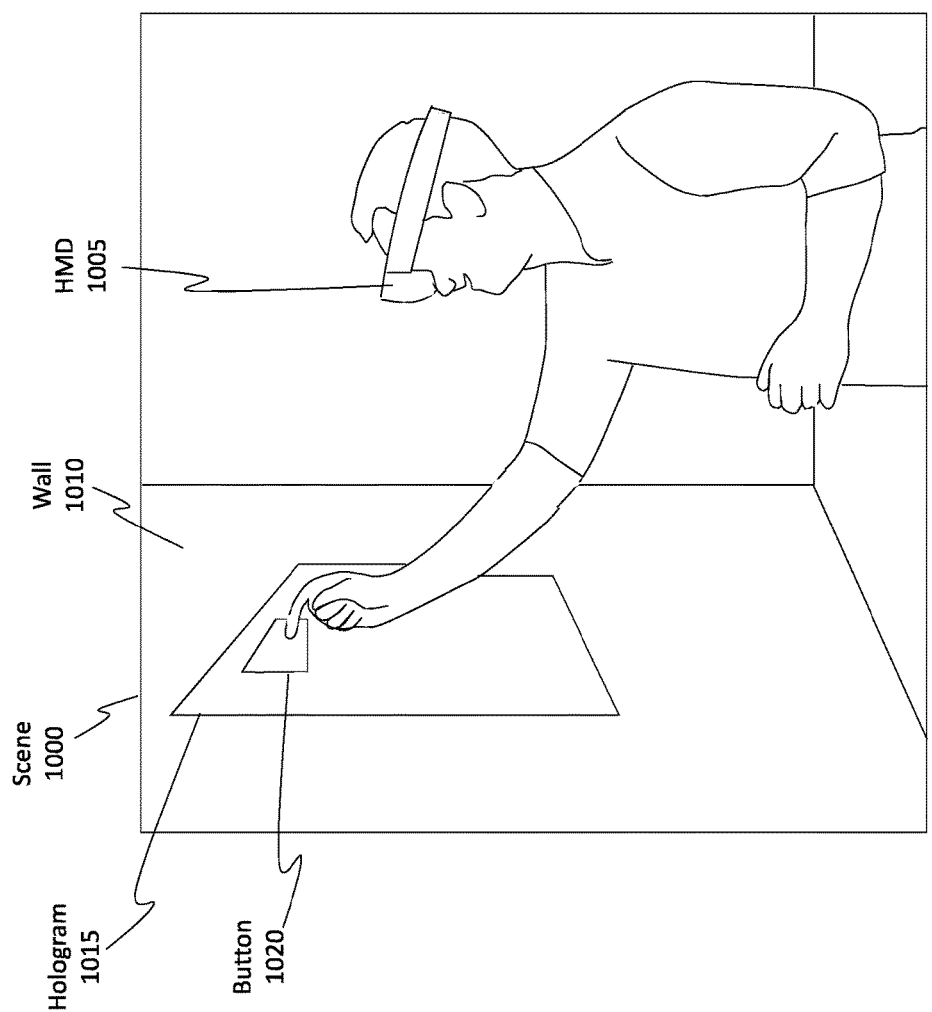
FIG. 10 illustrates another example scene.

FIGS. 10 through 13 illustrate a particular scenario in which the embodiments consider the layout of the environment when determining where to position or reposition a hologram. In particular, FIG. 10 shows a scene 1000 that includes a user wearing an HMD 1005. The scene 1000 further includes a wall 1010 and a hologram 1015 that includes a button 1020. In this scene, the user is shown as interacting with the button 1020 by trying to press it.

Figure 11:
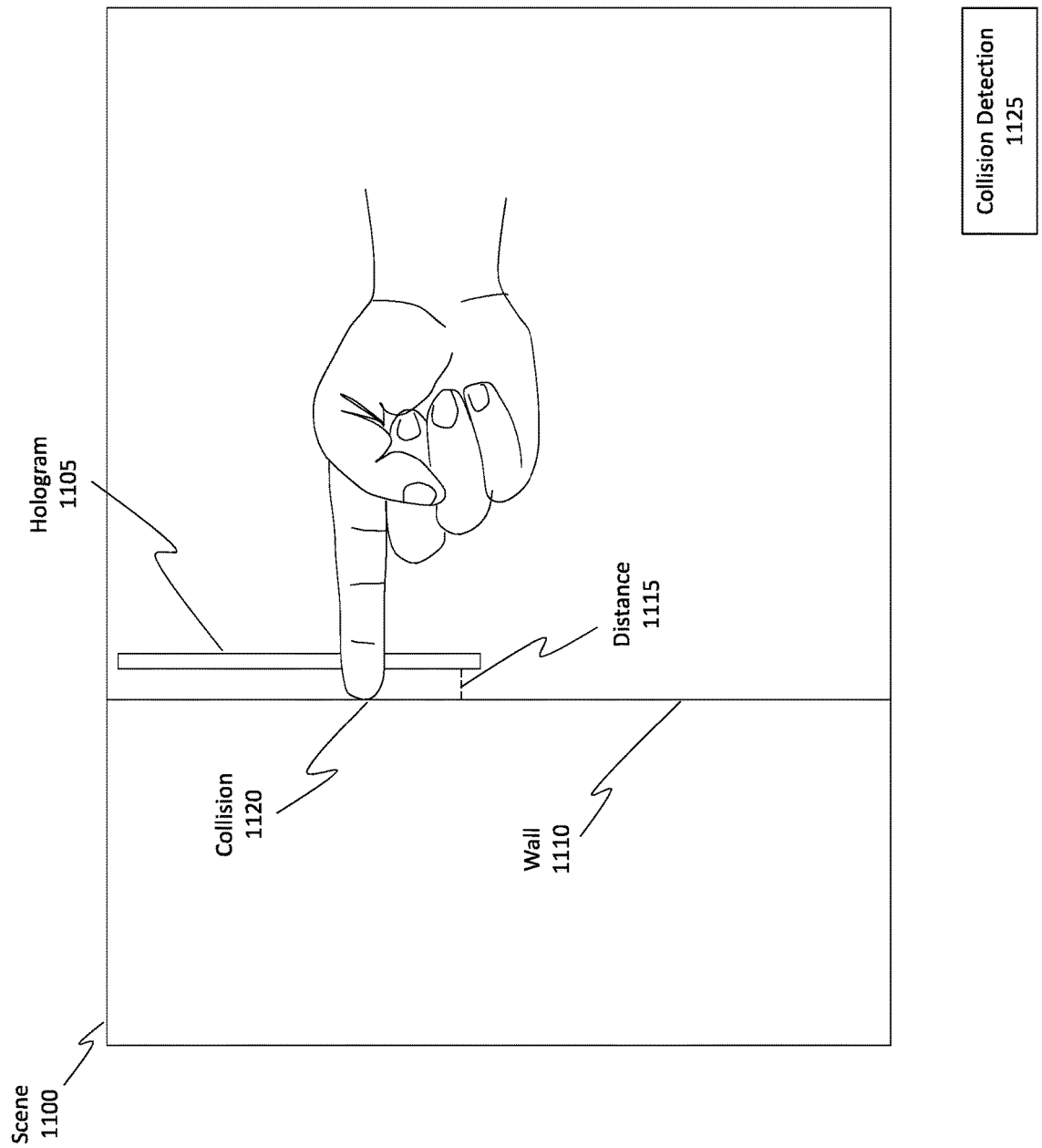
FIG. 11 illustrates another example scene.

FIG. 11 shows a side profile view of the scene 1000 from FIG. 10. In particular, FIG. 11 shows a scene 1100 that includes a hologram 1105 and the wall 1110. Notice, the hologram 1105 is currently placed at a location where the distance 1115 between the hologram 1105 and the wall 1110 is quite small. As a result, it is highly likely that when the user goes to press the hologram button, the user's finger will collide with the wall 1110, as shown by collision 1120. Such a scenario is not desirable. The embodiments are able to perform collision detection 1125 and place holograms at positions so as to avoid a scenario where a user might collide with another object in the scene (e.g., chairs, walls, tables, etc.). Further details will be provided shortly.

Figure 12:
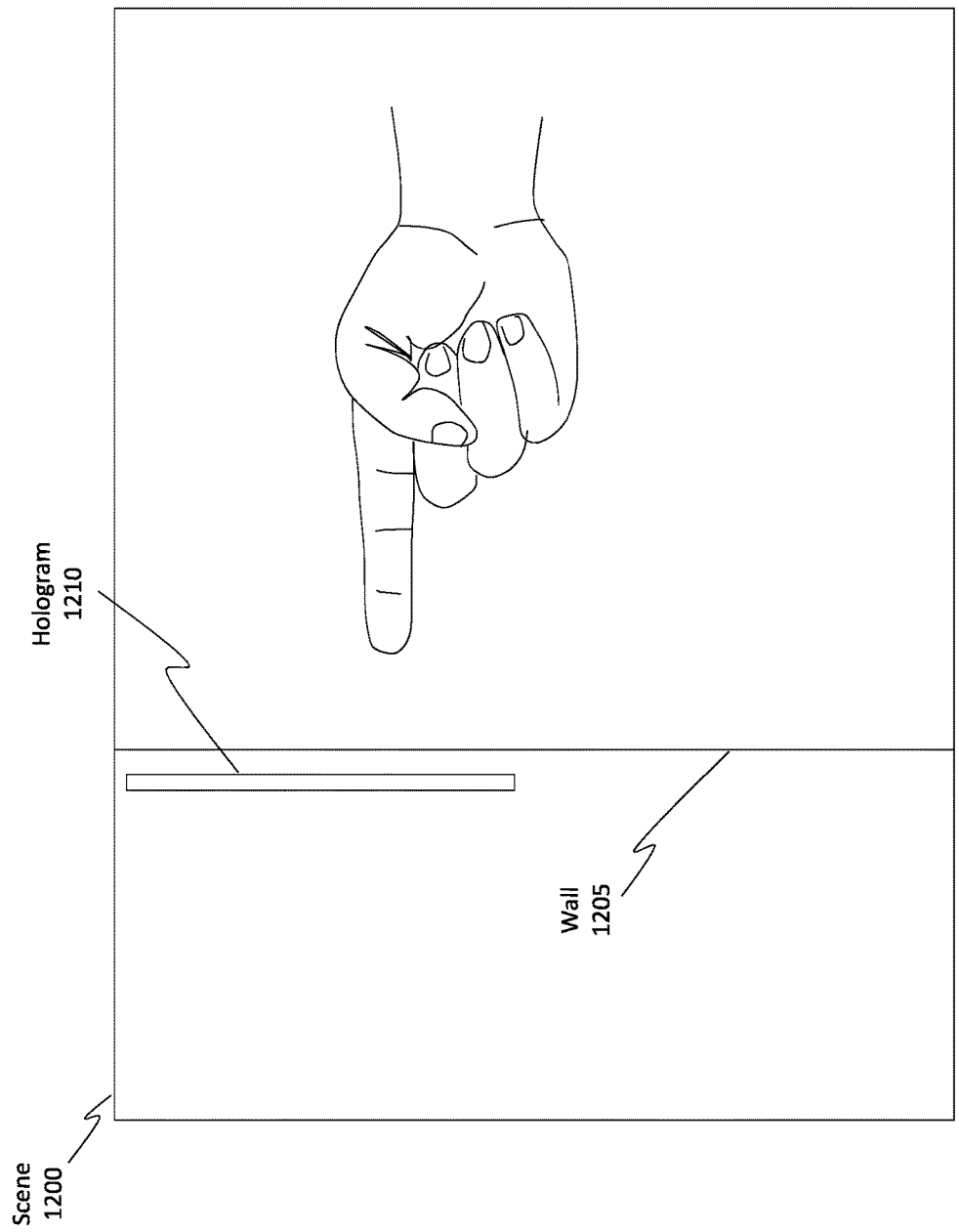
FIG. 12 illustrates another example scene.

FIG. 12 shows another scene 1200 involving the wall 1205 and the hologram 1210. In this case, the hologram 1210 is actually rendered in a manner as if the hologram 1210 were inside or at least on the other side of the wall 1205 from the user, such that the user is unable to see the hologram 1210, or perhaps can see it but cannot interact with it. This scenario may arise if the hologram is one that is locked to a particular depth with respect to the user's FOV. Similar to the above scenario, this scenario is also undesirable.

Figure 13:
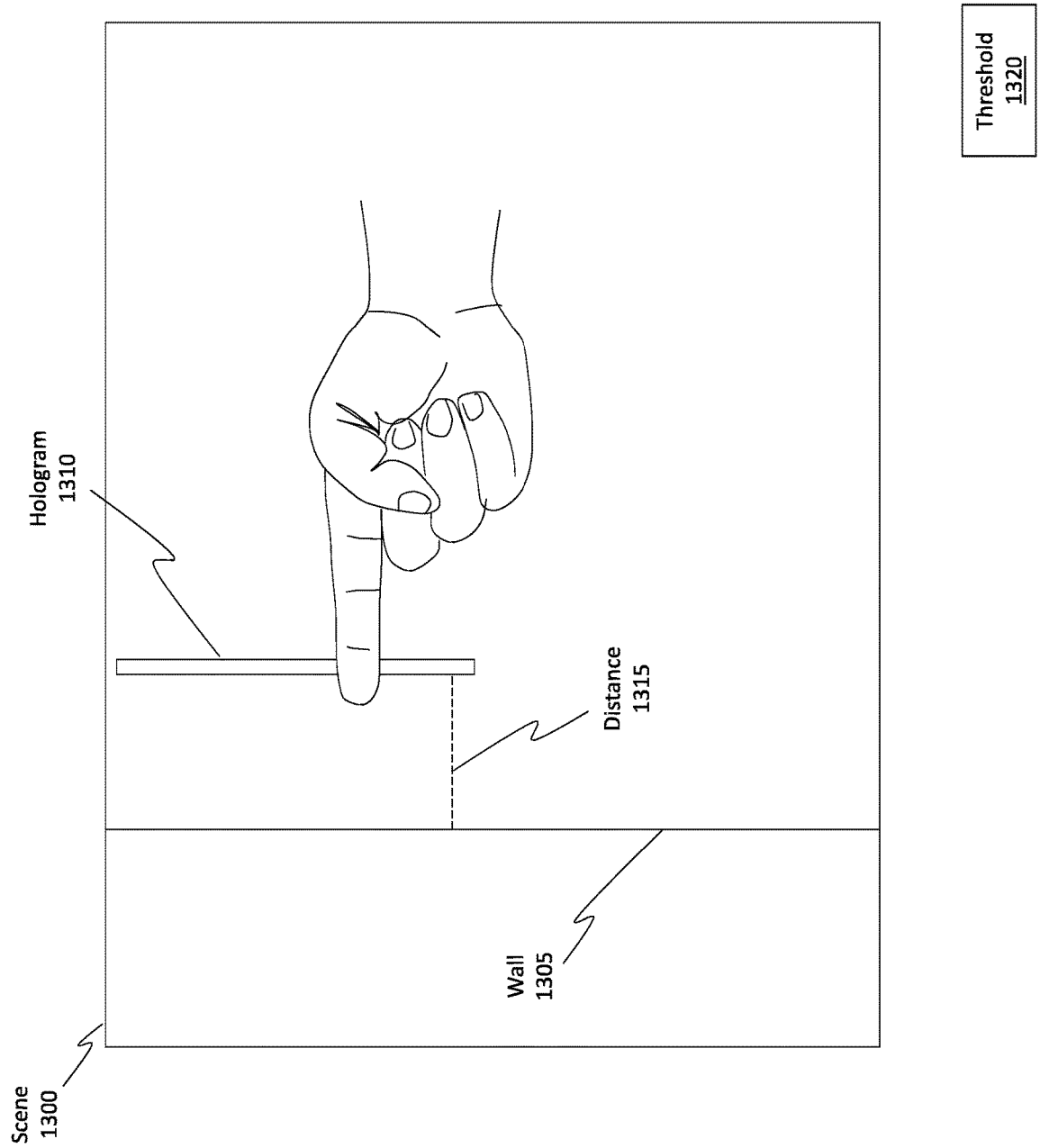
FIG. 13 illustrates another example scene.

In accordance with the disclosed principles, the embodiments are able to reposition a hologram based on the placement considerations mentioned earlier, one of which includes the layout of the environment. FIG. 13 shows an example scene 1300 that includes a wall 1305 and a hologram 1310. In this scenario, the embodiments have repositioned the hologram 1310 to a new location that is a distance 1315 away from the wall 1305, where this distance is at least a threshold 1320 distance set to avoid a scenario where the user's finger might collide with the wall 1305. As an example, the threshold 1320 may be set to 6 inches, 12 inches, or any distance that is set to avoid a scenario where the user's finger will crash into the wall 1305 when the user tries to press the hologram button. Thus, the embodiments consider the layout of the environment when determining where to position or reposition holograms. As will be discussed in more detail, some embodiments also change the color and/or texture of the hologram to denote the presence of an object in the background.

FIGS. 14 through 18 illustrate various examples in which a user or content author has identified an area that is unsafe, should be avoided, or otherwise should trigger a raised awareness on the part of the user.

Figure 14:
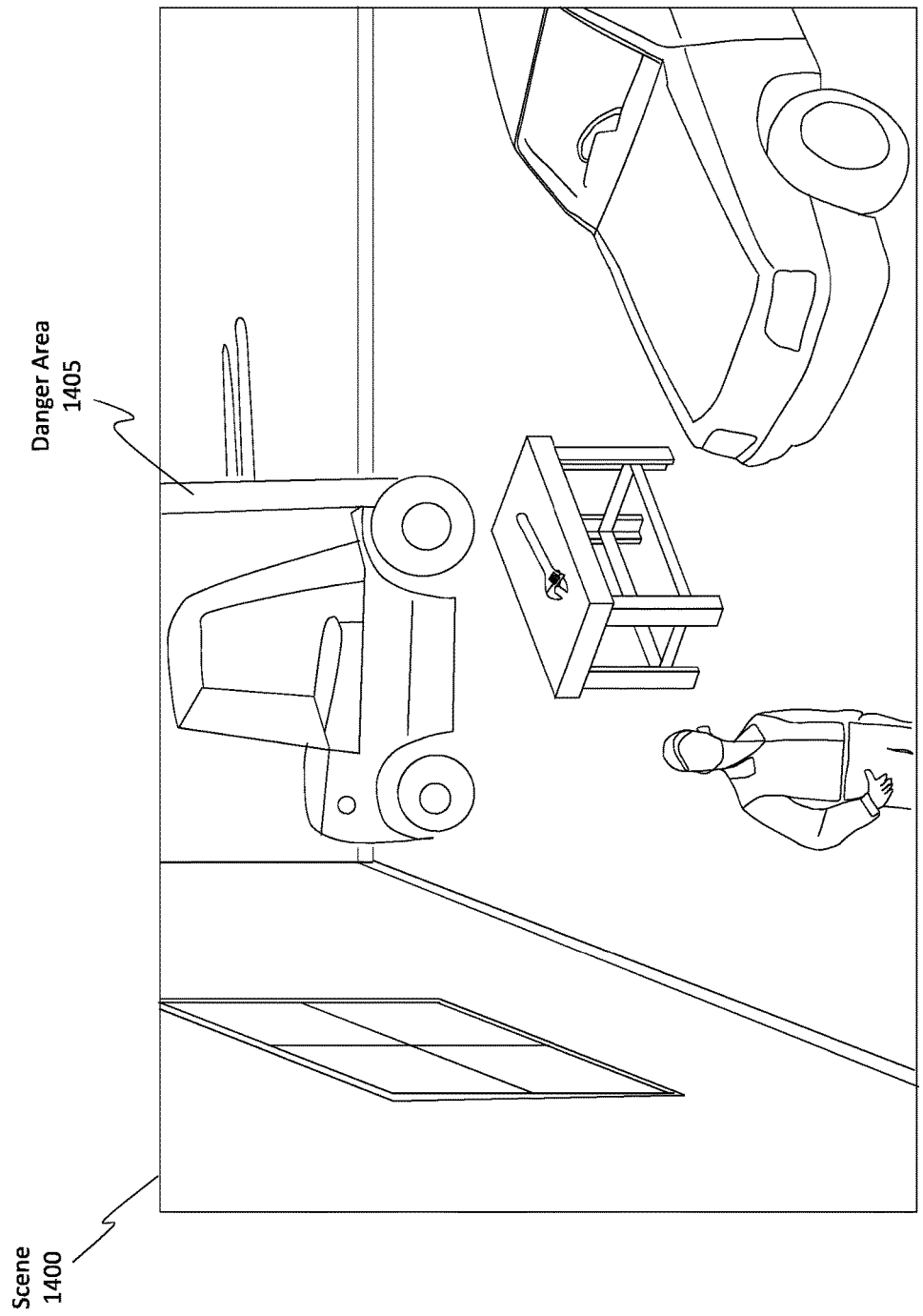
FIG. 14 illustrates another example scene.

FIG. 14 shows an example scene 1400 that includes a danger area 1405 due to the presence of heavy machinery (e.g., a forklift). It is desirable to avoid a scenario where the user is unaware of the danger area 1405. As a result, the embodiments include functionality for allowing a user, content author, and/or the ML engine to identify the danger area 1405 and to mark it as such. Marking the danger area 1405 causes the embodiments to modify how holograms are placed and/or visualized.

Figure 15:
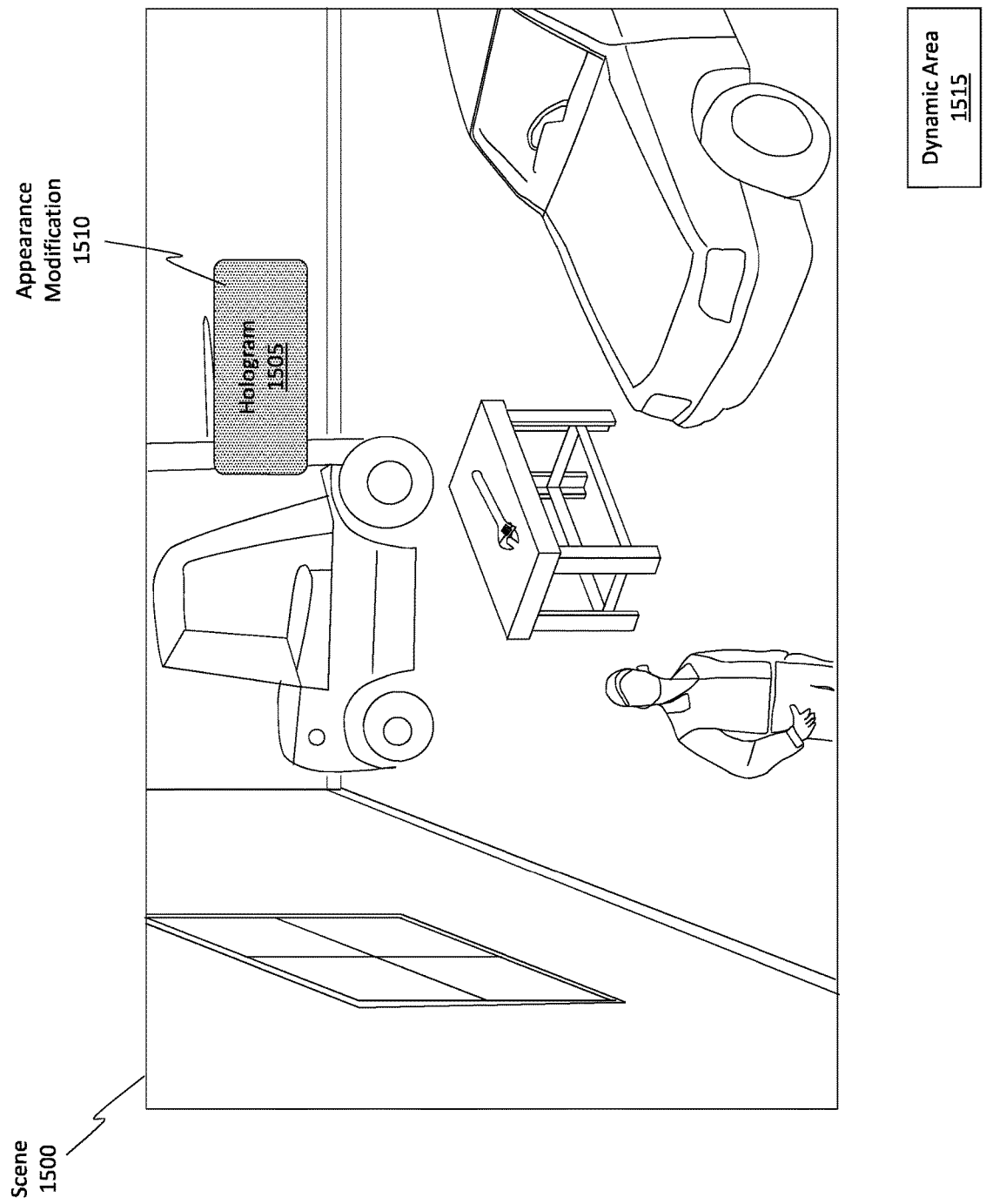
FIG. 15 illustrates another example scene.

For instance, FIG. 15 shows a scene 1500 that includes a hologram 1505. In this scenario, the hologram 1505 is permitted to be placed in the danger area, but a visual appearance of the hologram 1505 is modified to reflect that the user's awareness should be heightened with regard to this area, as shown by appearance modification 1510. The appearance modification 1510 can include a change in color, shape, flashing, texture, transparency, or size of the hologram.

In addition to modifying how holograms appear when placed in a danger area, the appearance of a hologram can also be modified when a hologram is placed in a dynamic area 1515, as mentioned before. The dynamic area 1515 can be one in which a high level of movement or potential movement may occur. Examples include, but are not limited to, hallways, elevators, congregation areas, and so on. When a hologram is positioned in or near a dynamic area, the appearance of that hologram can be modified to raise the awareness of the user so the user avoids a potential collision.

Figure 16:
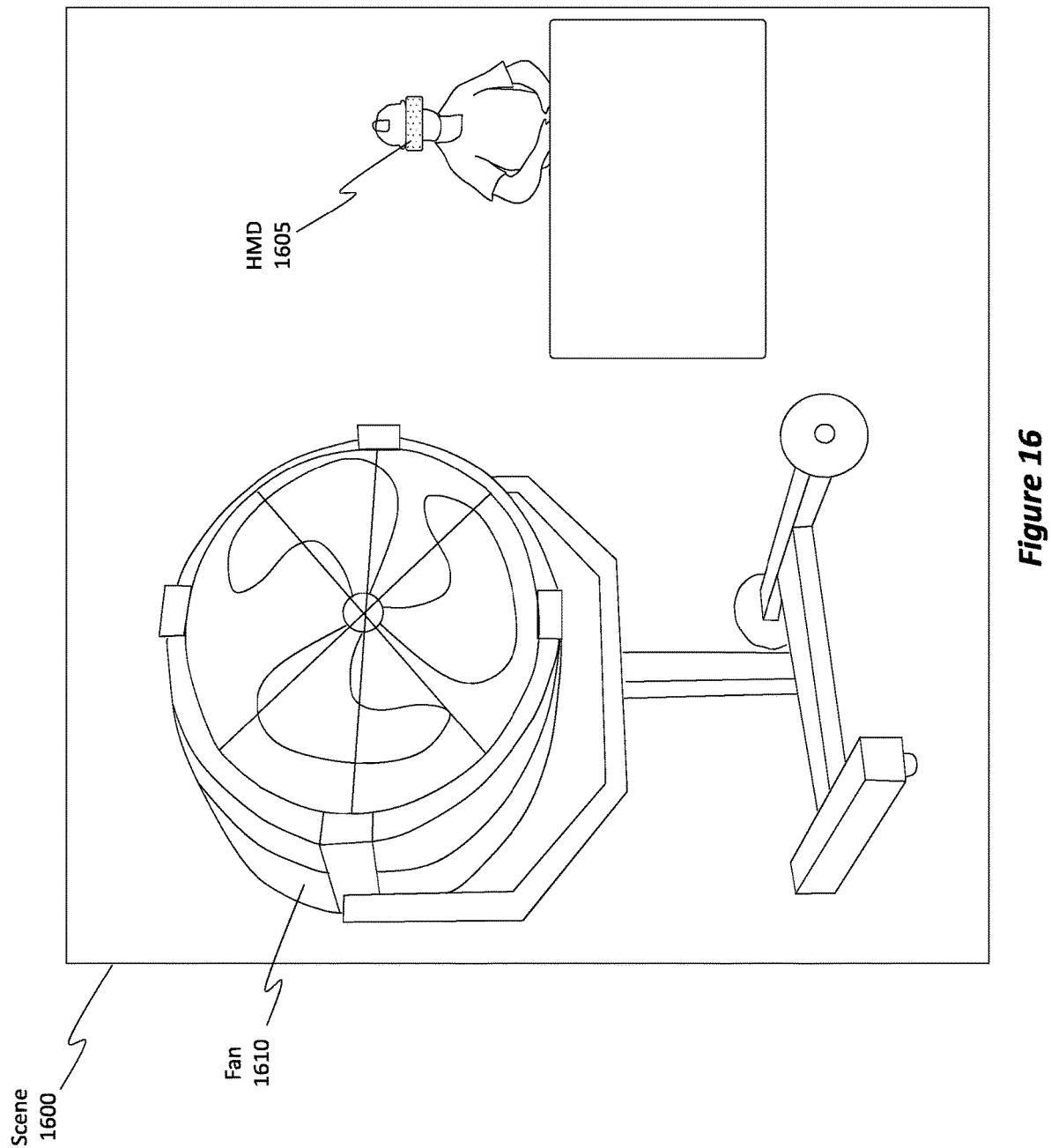
FIG. 16 illustrates another example scene.

FIG. 16 shows a scene 1600 in which a user is wearing an HMD 1605. This scene includes a spinning fan 1610. The fan 1610 is recognized as being an object that is potentially hazardous if interacted with improperly.

Figure 17:
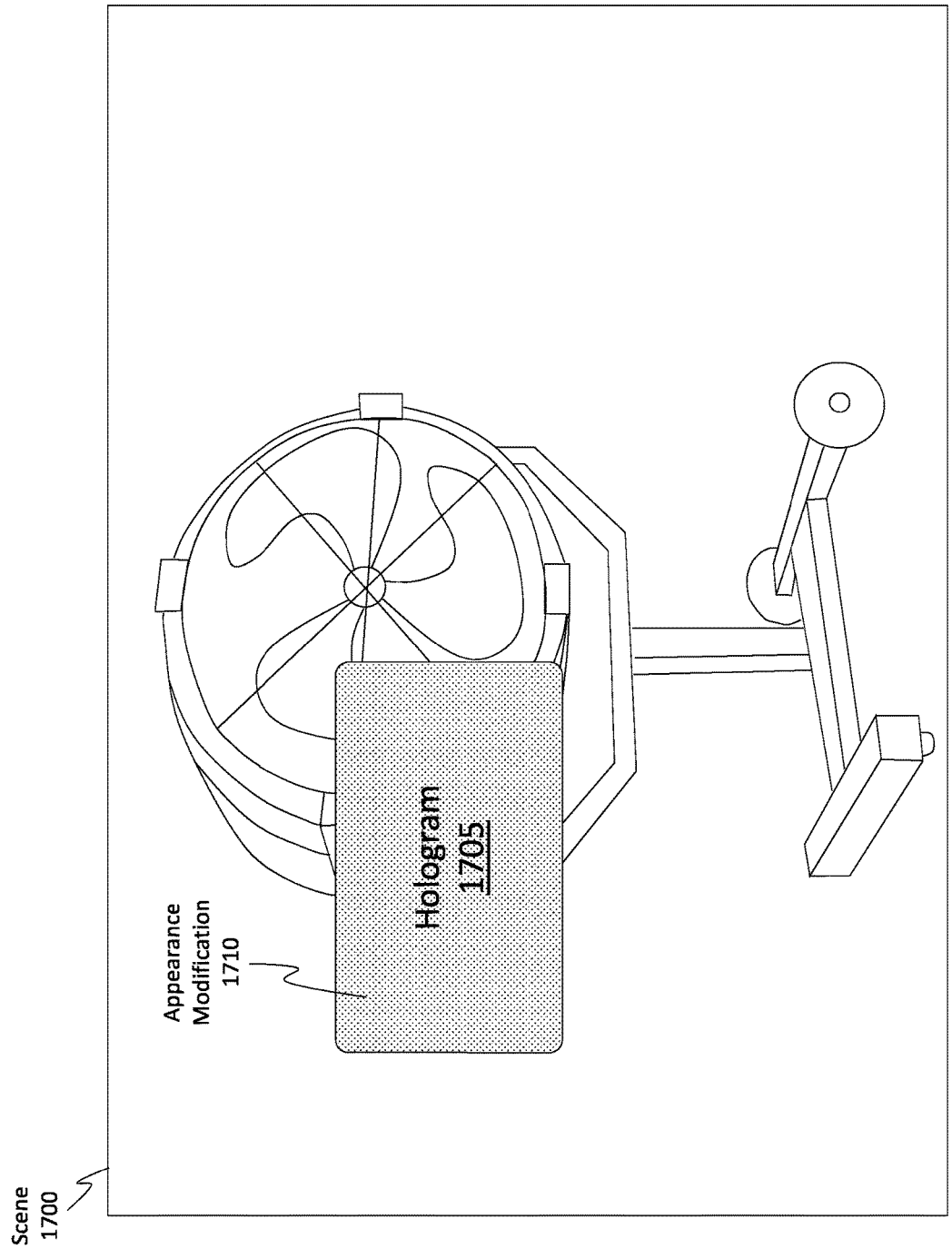
FIG. 17 illustrates another example scene.

FIG. 17 shows a scene 1700 in which a hologram 1705 is displayed. To raise the user's awareness of the proximity between the fan and the hologram 1705, the appearance of the hologram 1705 is modified, as shown by appearance modification 1710. Any type of appearance modification can be performed, as mentioned earlier. In this example, the color of the hologram 1705 has been modified to raise the user's awareness of the hologram's proximity to the fan.

Figure 18:
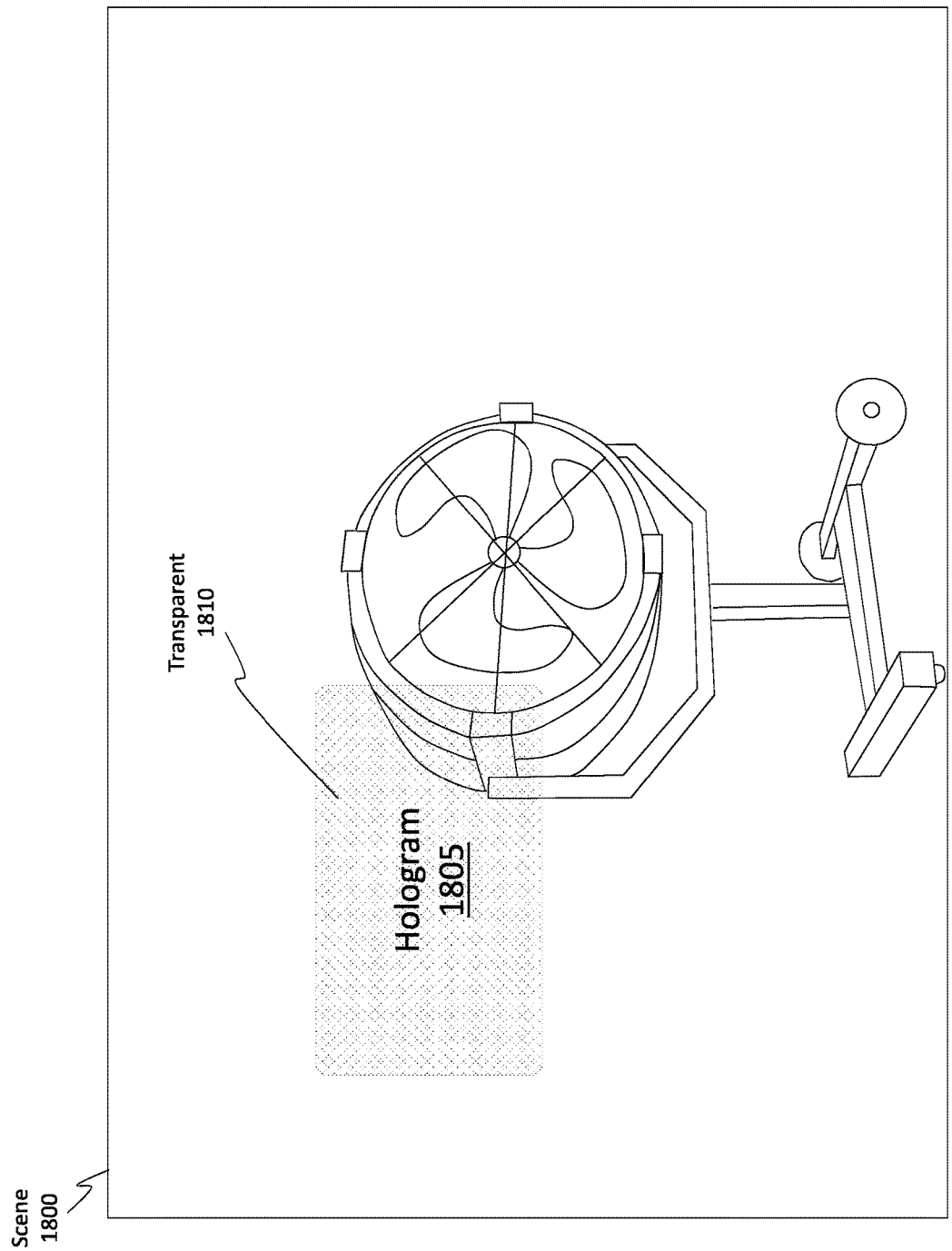
FIG. 18 illustrates another example scene.

FIG. 18 shows a scene 1800 involving the fan and the hologram 1805. Here, the hologram's appearance has been modified by altering the transparency of the hologram 1805, as shown by transparent 1810.

Accordingly, the disclosed embodiments consider multiple different factors when determining where to position or reposition a hologram. By considering the past scene information and/or the future scene information as well as any of the other considerations, the embodiments incorporate a heightened level of intelligence with regard to hologram placement.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 19:
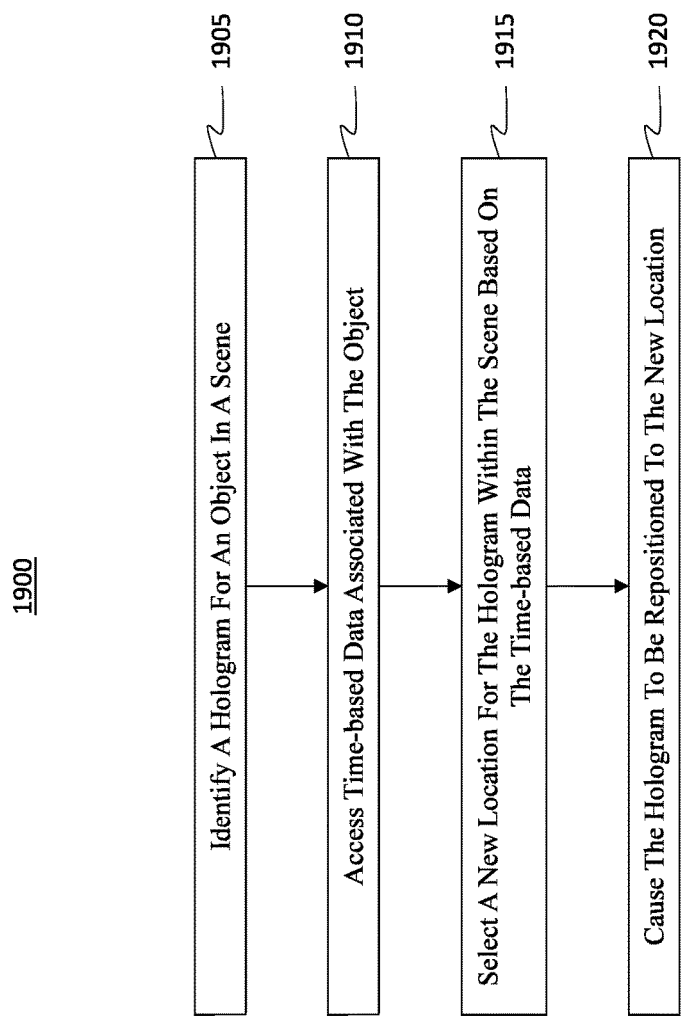
FIG. 19 illustrates a flowchart of an example method for repositioning a hologram.

Attention will now be directed to FIG. 19, which illustrates a flowchart of an example method 1900 for intelligently positioning or repositioning a hologram for an object in a scene based on a past condition of the object and/or a planned future condition of the object. Method 1900 can be implemented using the architecture 100 of FIG. 1 and/or the HMD 200A/B of FIG. 2. More particularly, method 1900 can be implemented by the service 105 of FIG. 1.

Method 1900 includes an act (act 1905) of identifying a hologram (e.g., hologram 705 in FIG. 7) for an object (e.g., engine 710 in FIG. 7) in a scene (e.g., scene 700). The process of identifying the hologram includes identifying a current location (e.g., current location 605A) of the hologram within the scene.

Act 1910 includes accessing time-based data (e.g., time-based data 125C from FIG. 1) associated with the object. The time-based data includes at least one of a past condition (e.g., past condition 305 from FIG. 3) of the object or a planned future condition (e.g., future condition 310) of the object.

Some embodiments also access a set of additional placement governing criteria (e.g., placement governing criteria 300 of FIG. 3). The set of placement governing criteria includes one or more of: (i) a specific placement (e.g., specific placement 335 of FIG. 3) of the hologram as specified by a content author, (ii) a placement range (e.g., placement range 340) of the hologram as specified by the content author, (iii) a state (e.g., object state 320) of the object, (iv) a state of a different object in the scene, or (v) a layout (e.g., environment layout 345) of the scene.

Act 1915 includes selecting a new location (e.g., new location 705A) for the hologram within the scene based on the time-based data. In some embodiments, the process of selecting the new location can be based on both (i) the time-based data and (ii) the set of placement governing criteria.

Act 1920 includes causing the hologram to be repositioned (e.g., reposition 715) to the new location (e.g., new location 705A). Notably, the process of repositioning the hologram is dependent on the time-based data. In some implementations, both of the past condition of the object and the planned future condition of the object are considered. In some implementations, the past condition of the object includes a past usage, past location, or past involvement with other objects or holograms within the context of the scene. Similarly, the planned future condition of the object can include a planned future usage, planned future location, or planned future involvement with other objects or holograms within he context of the scene.

The process of selecting the new location for the hologram within the scene can be further based on a plurality of other criteria, such as those illustrated in FIG. 3. As various examples, the plurality of criteria can include a specific placement of the hologram as specified by a content author, a placement range of the hologram as specified by the content author, a state of the object, a state of a different object in the scene, and/or a layout of the scene.

The new location is one at which the hologram will not obfuscate a second object in the scene, where the second object is one that has a different planned usage within a context of the scene. The second object can be another hologram or a real-world object. For instance, the hologram 810 of FIG. 8 is positioned so as to not obfuscate the tool and the hologram 805 in the scene 800.

The process of causing the hologram to be repositioned to the new location includes accessing a spatial map of the scene and relying on the spatial map to reposition the hologram. In some implementations, the new location of the hologram is within a threshold distance relative to the object. In some implementations, the process of selecting the new location for the hologram within the scene is further based on an area that is identified as being one to avoid for placement of holograms.

In some implementations, the set of placement governing criteria includes the layout of the scene. The layout of the scene can include an identification of a wall or obstruction in the scene, and the new location of the hologram may be at least a threshold distance away from the wall or obstruction. In some implementations, the new location of the hologram is selected so as to avoid a dynamic area or to avoid setting, anchoring, or otherwise modifying a hologram's position based on transient objects of a dynamic area.

Accordingly, some embodiments are structured to scan a target item (e.g., an object) to annotate with or without the room context where it will be. The embodiments are able to create content, such as a hologram. The content is associated with the scanned item. In some cases, the item can be a prototype or class, such as a class of several kinds of vehicular engines, or a scannable code, such as a QR code, barcode, etc. The user can mark other features of note, such as safety hazard zones, or sections that are not important for the content. If the user does not set this, the system can use its understanding of the content and presets to set these zones. Various constraints and placement ranges can be specified by the user, or defaults can be used from the system. These constraints can be based on user experience testing, size limitations, safety concerns, line of sight (e.g., to safety hazards, displays, or other parts of an object that are worthwhile to see), past user data (e.g., such as if users generally moved the content from one place to another, user placement preferences, etc.), and so on.

Example Computer/Computer Systems

Figure 20:
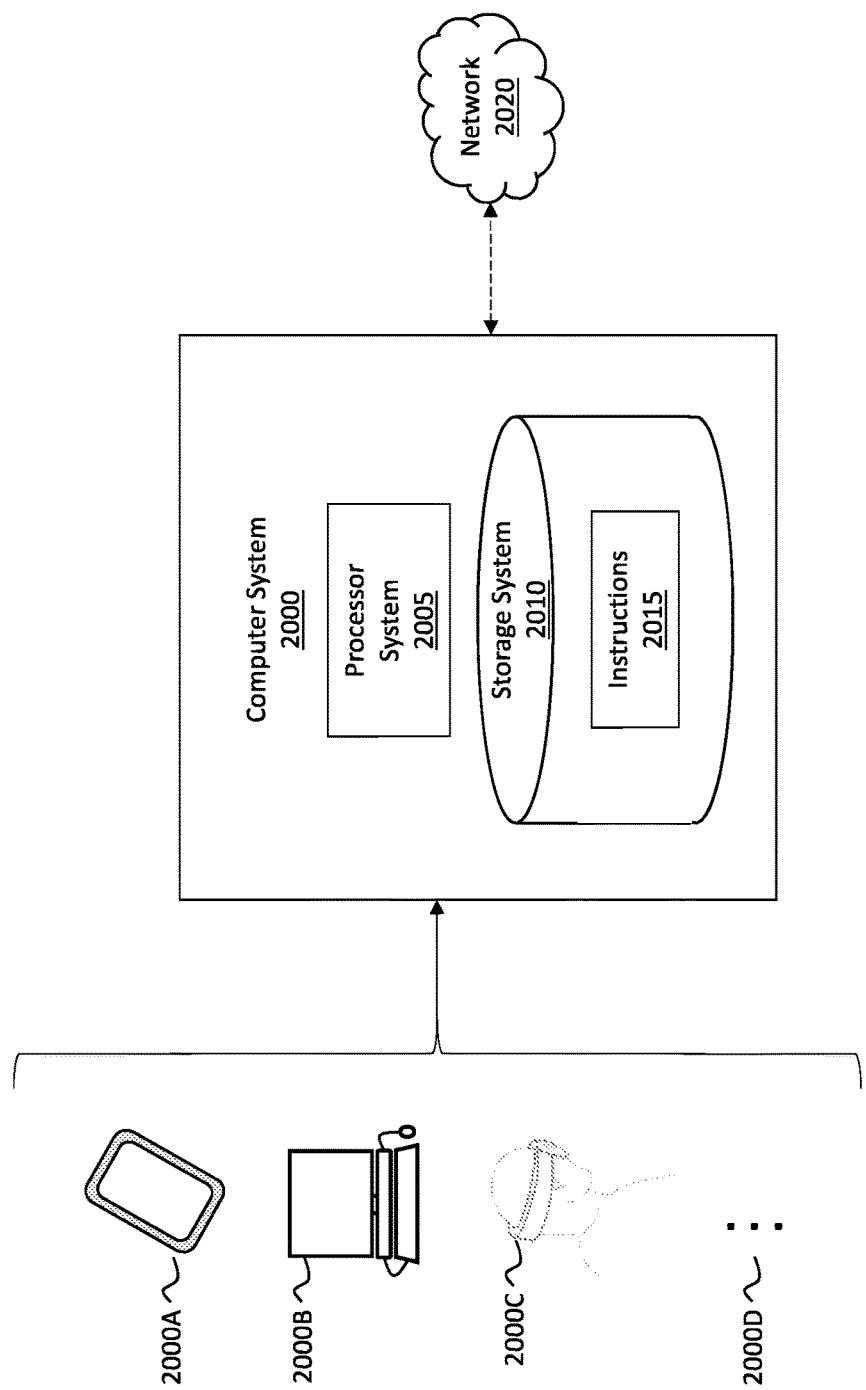
FIG. 20 illustrates an example computer system that can be configured to perform any of the disclosed operations.

Attention will now be directed to FIG. 20 which illustrates an example computer system 2000 that may include and/or be used to perform any of the operations described herein. Computer system 2000 may take various different forms. For example, computer system 2000 may be embodied as a tablet 2000A, a desktop or a laptop 2000B, an HMD 2000C, a mobile device, or any other standalone device, as represented by the ellipsis 2000D. Computer system 2000 may also be a distributed system that includes one or more connected computing components/devices that are in communication with computer system 2000.

In its most basic configuration, computer system 2000 includes various different components. FIG. 20 shows that computer system 2000 includes a processor system 2005 that includes one or more processor(s) (aka a "hardware processing unit") and a storage system 2010.

Regarding the processor(s) of the processor system 2005, it will be appreciated that the functionality described herein can be performed, at least in part, by one or more hardware logic components (e.g., the processor(s)). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 2000. The different components, modules, engines, and services described herein may be implemented as objects or processors that execute on computer system 2000 (e.g. as separate threads).

Storage system 2010 may be physical system memory, which may be volatile, non-volatile, or some combination of the two. The term "memory" may also be used herein to refer to non-volatile mass storage such as physical storage media. If computer system 2000 is distributed, the processing, memory, and/or storage capability may be distributed as well.

Storage system 2010 is shown as including executable instructions 2015. The executable instructions 2015 represent instructions that are executable by the processor(s) of computer system 2000 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2000 may also be connected (via a wired or wireless connection) to external sensors (e.g., one or more remote cameras) or devices via a network 2020. For example, computer system 2000 can communicate with any number devices or cloud services to obtain or process data. In some cases, network 2020 may itself be a cloud network. Furthermore, computer system 2000 may also be connected through one or more wired or wireless networks to remote/separate computer systems(s) that are configured to perform any of the processing described with regard to computer system 2000.

A "network," like network 2020, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2000 will include one or more communication channels that are used to communicate with the network 2020. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system that repositions a hologram for an object in a scene during a guided scenario, said computer system comprising:
   a processor system; and
   a memory system comprising instructions that are executable by the processor system to cause the computer system to:
   identify the hologram for the object in the scene, identifying the hologram includes identifying a current location of the hologram within the scene, the hologram providing information associated with the object during the guided scenario;
   access time-based data associated with the object, the time-based data includes at least one of: (i) a planned future condition of the object based on the guided scenario or (ii) a predicted future condition of the object based on an action of a user during the guided scenario, the action being directed either to the object or to a different object in the scene, the planned future condition and the predicted future condition identifying a future location of the object;
   select a new location for the hologram within the scene using the time-based data; and
   cause the hologram to be repositioned to the new location.

2. The computer system of claim 1, wherein the new location is different than the future location of the object such that the new location is selected to avoid subsequently obfuscating the object when the object is subsequently located at the future location.

3. The computer system of claim 1, wherein the time-based data includes a past condition of the object, wherein the past condition of the object includes a past usage of the object within a context of the scene, where the context of the scene is past usage and planned future usage of the object.

4. The computer system of claim 1, wherein the planned future condition of the object includes a planned future usage of the object within a context of the scene, where the context of the scene includes a past usage and a planned future usage of the object.

5. The computer system of claim 1, wherein selecting the new location for the hologram within the scene takes into account a plurality of criteria comprising one or more of: a specific placement of the hologram as specified by a content author, a placement range of the hologram as specified by the content author, a state of the object, a state of the different object in the scene, or a layout of the scene.

6. The computer system of claim 1, wherein the instructions are executable by the processor system to cause the computer system to monitor objects in the scene and to maintain a historical log that tracks how those objects have been used, and wherein accessing the time-based data associated with the object comprises accessing the historical log.

7. The computer system of claim 1, wherein the instructions are executable by the processor system to cause the computer system to monitor a duration that the object was used and/or a duration that the object was not used, and wherein accessing the time-based data associated with the object comprises accessing the duration.

8. The computer system of claim 1, wherein the instructions are executable by the processor system to cause the computer system to monitor where the object is located or has previously been located, and wherein accessing the time-based data associated with the object comprises accessing the monitored location.

9. The computer system of claim 1, wherein the instructions are executable by the processor system to cause the computer system to monitor what other objects the object interacted with, and wherein accessing the time-based data associated with the object comprises accessing the monitored other objects.

10. The computer system of claim 1, wherein the instructions are executable by the processor system to cause the computer system to determine future usage of the object based on a procedure guidebook.

11. A method for repositioning a hologram for an object in a scene during a guided scenario provided by an extended reality (ER) device, said method being implemented by the ER device and comprising:
   identifying the hologram for the object in the scene, identifying the hologram includes identifying a current location of the hologram within the scene, the hologram providing information associated with the object during the guided scenario;
   accessing time-based data associated with the object, the time-based data includes at least one of: (i) a planned future condition of the object based on the guided scenario or (ii) a predicted future condition of the object based on an action of a user during the guided scenario, the action being directed either to the object or to a different object in the scene, the planned future condition and the predicted future condition identifying a future location of the object;

selecting a new location for the hologram within the scene based on the time-based data; and causing the hologram to be repositioned to the new location.

12. The method of claim 11, wherein the new location is one at which the hologram will not obfuscate a second object in the scene, where the second object is one that has a different planned usage within a context of the scene.

13. The method of claim 11, wherein causing the hologram to be repositioned to the new location includes accessing a spatial map of the scene and relying on the spatial map to reposition the hologram.

14. The method of claim 11, wherein the new location of the hologram is within a threshold distance relative to the object.

15. The method of claim 11, wherein selecting the new location for the hologram within the scene is further based on an area that is identified as being one to avoid for placement of holograms.

16. A method for repositioning a hologram for an object in a scene during a guided scenario provided by an extended reality (ER) device, said method being implemented by the ER device and comprising:

identifying the hologram for the object in the scene, wherein identifying the hologram includes identifying a current location of the hologram within the scene, and wherein the hologram provides information associated with the object during the guided scenario;

accessing time-based data associated with the object, wherein the time-based data includes at least one of: (i) a planned future condition of the object based on the guided scenario or (ii) a predicted future condition of the object based on an action of a user during the guided scenario, the action being directed either to the object or to a different object in the scene, the planned future condition and the predicted future condition identifying a future location of the object;

accessing a set of placement governing criteria, wherein the set of placement governing criteria includes one or more of: (i) a specific placement of the hologram as specified by a content author, (ii) a placement range of the hologram as specified by the content author, (iii) a state of the object, (iv) a state of a different object in the scene, or (v) a layout of the scene;

selecting a new location for the hologram within the scene based on (i) the time-based data and (ii) the set of placement governing criteria; and causing the hologram to be repositioned to the new location.

17. The method of claim 16, wherein the time-based data includes a past condition of the object.

18. The method of claim 16, wherein the set of placement governing criteria includes all of: (i) the specific placement of the hologram as specified by the content author, (ii) the placement range of the hologram as specified by the content author, (iii) the state of the object, (iv) the state of the different object in the scene, and (v) the layout of the scene.

19. The method of claim 16, wherein the set of placement governing criteria includes the layout of the scene, wherein the layout of the scene includes an identification of an obstruction in the scene, and wherein the new location of the hologram is at least a threshold distance away from the obstruction.

20. The method of claim 16, wherein the new location of the hologram is selected so as to avoid a dynamic area.

* * * * *